(12) United States Patent
Tatarka et al.

(10) Patent No.: US 6,777,046 B1
(45) Date of Patent: Aug. 17, 2004

(54) PUNCTURE RESISTANT, HIGH SHRINK FILMS, BLENDS, AND PROCESS

(75) Inventors: Paul David Tatarka, Woodridge, IL (US); Paul Nick Georgelos, Naperville, IL (US); Scott Allan Idlas, Downers Grove, IL (US)

(73) Assignee: Curwood, Inc., Oshkosh, WI (US)

( * ) Notice: Subject to any disclaimer, the term of this patent is extended or adjusted under 35 U.S.C. 154(b) by 0 days.

(21) Appl. No.: 09/431,931

(22) Filed: Nov. 1, 1999

Related U.S. Application Data

(63) Continuation-in-part of application No. 09/192,845, filed on Nov. 16, 1998, now abandoned, and a continuation-in-part of application No. 09/168,282, filed on Oct. 8, 1998, now abandoned, and a continuation-in-part of application No. 09/401,692, filed on Sep. 22, 1999, and a continuation-in-part of application No. 09/110,455, filed on Jul. 7, 1998.

(51) Int. Cl.[7] ............................ B32B 27/00; C08L 33/00
(52) U.S. Cl. .................... 428/34.9; 428/35.1; 428/35.7; 428/36.9; 428/220; 428/500; 428/515; 428/516; 428/518; 428/520; 428/910; 525/221; 525/222; 525/227; 525/237; 525/240; 264/464
(58) Field of Search ................. 428/220, 515, 428/516, 36.9, 34.3, 34.9, 34.8, 518, 35.1, 35.2, 35.4, 35.5, 35.7, 520, 910; 525/240, 221, 222, 227, 237; 264/464

(56) References Cited

U.S. PATENT DOCUMENTS

| | | | |
|---|---|---|---|
| 3,456,044 A | 7/1969 | Pahlke | 264/25 |
| 4,064,296 A | 12/1977 | Bornstein et al. | 428/35 |
| 4,178,401 A | 12/1979 | Weinberg et al. | 428/35 |
| 4,247,584 A | 1/1981 | Widiger et al. | 428/35 |
| 4,311,808 A | 1/1982 | Su | 525/222 |
| 4,367,256 A | 1/1983 | Biel | 428/218 |
| 4,737,391 A | 4/1988 | Lustig et al. | 428/35 |
| 4,857,399 A | 8/1989 | Vicik | 428/515 |
| 5,055,328 A | 10/1991 | Evert et al. | 428/34.9 |
| 5,093,188 A | 3/1992 | Dohrer | 428/215 |
| 5,272,016 A | 12/1993 | Ralph | 428/516 |
| 5,279,872 A | 1/1994 | Ralph | 428/34.9 |
| 5,283,128 A | 2/1994 | Wilhoit | 428/516 |
| 5,326,627 A | 7/1994 | Yazaki et al. | 428/216 |
| 5,334,428 A | 8/1994 | Dobreski et al. | 428/34.9 |
| 5,397,613 A | 3/1995 | Georgelos | 428/36.7 |
| 5,397,640 A | 3/1995 | Georgelos et al. | 428/349 |
| 5,399,426 A | 3/1995 | Koch et al. | 428/335 |
| 5,403,668 A | 4/1995 | Wilhoit | 428/500 |
| 5,415,905 A | 5/1995 | Middlesworth et al. | 528/35.7 |
| 5,460,861 A | 10/1995 | Vicik et al. | 428/34.9 |
| 5,593,747 A | 1/1997 | Georgelos | 428/36.7 |
| 5,635,261 A | 6/1997 | Georgelos et al. | 428/35.4 |
| 5,707,751 A | 1/1998 | Garza et al. | 428/515 |
| 5,759,648 A | 6/1998 | Idlas | 428/34.9 |
| 5,914,164 A | 6/1999 | Ciocca et al. | 428/36.7 |
| 5,928,740 A | 7/1999 | Wilhoit et al. | 428/34.9 |
| 5,972,444 A | 10/1999 | Patel et al. | 428/25.2 |

FOREIGN PATENT DOCUMENTS

| | | |
|---|---|---|
| EP | 436196 | 7/1991 |
| GB | 2296005 A | 6/1996 |
| NZ | 228556 | 10/1990 |
| NZ | 250524 | 2/1996 |
| NZ | 276069 | 12/1997 |
| WO | PCT WO 93/13143 | 7/1993 |
| WO | WO 98/38035 | 9/1998 |

*Primary Examiner*—Monique R. Jackson
(74) *Attorney, Agent, or Firm*—Cedric M. Richeson

(57) ABSTRACT

A polymer blend and mono-and multilayer films made therefrom having an improved combination of properties such as high shrinkage values and high puncture resistance wherein the blend has a first copolymer of ethylene and octene-1 having a copolymer melting point of from 55 to 95° C., preferably of from 80 to 92° C.; a second copolymer of ethylene and at least a α-olefin having a copolymer melting point of from 115 to 128° C.; and a third copolymer of ethylene and a vinyl ester or alkyl acrylate and having a melting point of from 60 to 110° C., and a process for making such films, which preferably have at least 45% shrinkage at 90° C. in at least one direction.

107 Claims, 3 Drawing Sheets

PUNCTURE RESISTANT, HIGH SHRINK FILMS, BLENDS, AND PROCESS

CROSS-REFERENCE TO RELATED APPLICATION

This application is a continuation-in-part of U.S. patent application Ser. Nos.: 09/192,845, filed Nov. 16, 1998, now abandoned; 09/168,282, filed Oct. 8, 1998, now abandoned; and 09/401,692 filed Sep. 22, 1999, now allowed, which applications are hereby incorporated by reference, and is a continuation-in-part of U.S. application Ser. No. 09/110,455, filed Jul. 7, 1998, now allowed.

BACKGROUND OF THE INVENTION

The invention relates to thermoplastic $C_2$-$\alpha$-olefin copolymer resin blends and flexible films thereof having heat shrinkable and/or puncture resistance properties. Such blends are useful for making films, particularly heat sealing, oriented films for packaging articles and for processing and/or packaging food articles, especially cook-in foods subject to pasteurization processes as well as fresh, frozen, or processed foods such as meat, poultry or cheese.

Manufacturers and wholesalers use flexible thermoplastic packaging films to provide economical, sanitary containers which help protect and/or preserve the freshness and wholesomeness of their products. These films are often sold in bag form. For example, a single or multilayer film is made into bags using a tubular film or one or more flat sheets or webs of film by well known processes involving e.g. cutting, folding and/or sealing the film to form bags. These films and bags may be printed and may also be uniaxially or biaxially oriented, heat shrinkable, irradiated, or may contain film layers which are abuse resistant or puncture resistant or which are crosslinked or which enhance or retard or prevent transmission of light, gases, or liquids therethrough. Frequently, multilayer films having one or more barrier layers to oxygen and/or moisture such as: saran(a polyvinylidene chloride copolymer); a modified saran e.g. containing methyl acrylate polymer units; ethylene vinyl alcohol copolymer, nylon; or acrylonitrile may be used with a heat sealing layer such as a copolymer of ethylene and vinyl acetate (EVA) to produce bags for packaging oxygen and/or moisture sensitive foods e.g. processed pork or fresh red meat. Such bags help preserve meat in its original condition by preventing or reducing moisture loss and chemical changes in the meat structure due to oxidation reactions.

A typical packaging bag has 1–3 sides heat sealed by the bag manufacturer leaving one open side to allow product insertion. For example, a processor may insert fresh, frozen or processed meat, ham, poultry, cheese, primal or subprimal meat cuts, ground beef, fruits, vegetables, bread or other products making a final seal to hermetically enclose the product in the bag. This final seal may follow gas evacuation (i.e. vacuum removal) or replacement of the gaseous environment within the bag by one or more gases to provide some advantage such as to assist product preservation. This final seal is frequently a heat seal similar to the initial seals produced by the bag manufacturer although the actual heat sealing equipment may vary.

Thus, bags are made: by transversely sealing tubular stock of monolayer or multilayer film and cutting off the tube portion containing the sealed end; by making two spaced apart transverse seals on tubular stock and cutting open the side of the tube; by superimposing flat sheets of film and sealing on three sides; or by folding a flat sheet and sealing two sides.

Generally heat seals are made by applying sufficient heat and pressure to adjacent film layer surfaces for a sufficient time to cause a fusion bond between the plastic film layers.

A common type of seal used in manufacturing bags is known to those skilled in the art as a hot bar seal. In making a hot bar seal, adjacent thermoplastic layers are held together by opposing bars of which at least one is heated to cause the layers to fusion bond by application of heat and pressure across the area to be sealed. For example, bags may be made from a tube stock by making one hot bar bottom seal transverse to a tubular film. Once the bottom seal is made, the tube stock is transversely cut to form the mouth of the bag.

After a product is inserted, the bag is typically evacuated and the bag mouth sealed to enclose the product. At one time, the standard method for sealing was to fasten a clip around the mouth of the bag. However, heat sealing techniques are now also commonly employed to produce the final closure of the bag. For example, a bag mouth may be either hot bar sealed or impulse sealed. An impulse seal is made by application of heat and pressure using opposing bars similar to the hot bar seal except that at least one of these bars has a covered wire or ribbon through which electric current is passed for a very brief time period (hence the name "impulse") to cause the adjacent film layers to fusion bond. Following the impulse of heat the bars are typically cooled (e.g. by circulating coolant) while continuing to hold the bag inner surfaces together to achieve adequate sealing strength.

Relative to hot bar seals, impulse seals may be made faster because of the quick cool down of the ribbon following the heat impulse. Impulse seals are also generally narrower giving an improved package appearance, but narrower seals also leave less margin for error in the production of continuous sealed edges. Less area is usually bonded in an impulse seal relative to a hot bar seal, thus the performance of the film's sealing layer is more critical.

Disadvantageously, the film in the seal area often becomes extruded during impulse sealing of known films. This results in thinning of the film and a reduction of film strength in the seal area. In extreme situations, the thinned film is severed or pulled apart. Those skilled in the art refer to severely extruded seals as "burn through" seals. A "burn through" seal does not have adequate strength or integrity to protect the packaged product. One attempt to solve this "burn through" problem is to irradiate the film prior to manufacture of the bag.

Irradiation of a film made from cross-linkable polymer resins causes resin layers in the film to crosslink. Under controlled conditions, crosslinking by irradiation raises and may also broaden the temperature range for heat sealing, and depending upon the film composition may also enhance puncture resistance of the film. If the heat sealing layer of the thermoplastic film is crosslinked too heavily, it is more difficult to fusion bond which makes achieving strong seals difficult, particularly by impulse sealing. All bag seals must maintain their integrity to preserve and protect enclosed products, especially food products.

There must be a strong continuous seal to prevent unwanted egress and ingress of gaseous, liquid or solid materials between the bag exterior and interior. This is particularly necessary when the package is made of heat shrinkable film and is to be immersed in hot water to shrink the film against the packaged article since such shrinkage increases the stress on these seals. It is even more critical where the packages are to be immersed at sufficient times and temperatures for pasteurization or cooking. Thus, there is a continuing need for films which can be made into bags having strong seals especially those formed by hot bar and/or impulse sealing. Such films should provide strong seals able to withstand a range of temperatures and also be able to make such seals over a wide sealing temperature range without burn through.

Variations in sealing temperatures, times and pressure are known to exist from one brand or type of sealer to another and also between different sealing machines sold under the same brand. This increases the desirability for films that may be usefully sealed on different sealing machines and over a wide range of temperatures to produce strong integral seals.

Another heat sealing problem is that of inadvertent folding. Normally, a heat seal is made by applying heat and pressure across two portions of film, however, occasionally the area to be sealed will be inadvertently folded to produce a section of film having four or six film portions which are pressed between the opposing sealer bars. In such situations it is desirable to be able to seal the film without burn through. A wider impulse heat sealing temperature range is indicative of a greater latitude in sealing through folds than a narrower range.

Another problem during heat sealing is that of excessively high tear propagation strengths. Lower tear propagation strengths are an advantage in heat sealing operations using impulse sealing technology where the sealing apparatus both seats and cuts the film with the film trim being removed by tearing along the cut. Low tear propagation strengths enable quick trim removal without damage to the seal, film or bag.

A very demanding application for heat shrinkable, heat sealable thermoplastic flexible films is for processing meats. Bacterial contamination during food processing e.g. by Listeria monocytogenes is of great concern. To address health and safety concerns with processed foods, some processors have adopted a surface heat treatment at elevated temperatures sufficient to kill bacteria on already cooked food.

In some demanding applications a food product such as a ham is sealed inside a plastic processing bag or film in which the ham is cooked, refrigerated, shipped and subsequently displayed for retail sale.

In a more common demanding application, food such as a turkey breast, ham, or beef is cooked in a pan, net, or processing film from which the cooked food is removed for further processing such as: slicing; smoking in a smokehouse; treatment with colorants and/or flavorants such as caramel, spices, liquid smoke or honey; glazing; and/or removal of liquid (known as purge) resulting from e.g. the cooking process. Following this further processing, the food product is packaged, often in a printed bag, for shipment and sale. The cooked food is typically placed into a heat sealable, heat shrinkable bag which is then emptied of atmospheric gases by vacuum, heat sealed and subjected to a film shrinking operation usually in a water tank at elevated temperature for a brief period of time to produce a compact attractive package. During these steps which follow cooking and occur prior to packaging for shipment and sale, the food product surface is subject to environmental contamination, for example, by airborne particles, microbes, and dust. The risk from contamination after packaging may be minimized by surface pasteurizing the encased sealed package e.g. in a water bath or steam chamber held at elevated temperatures for a time sufficient to provide the desired degree of protection from microbial contamination and growth. The time and temperatures of this post-cooking pasteurization step may vary widely.

Significantly this surface treatment is in addition to the cooking or pasteurization process and follows hermetically sealing the cooked or pasteurized food in a plastic packaging film. In this demanding use, this "postcooking pasteurization" surface treatment is performed after placing the food into the packaging film that will remain on the pasteurized product through sale to an ultimate customer. Often the films are printed with consumer information and brand identification and frequently at least a portion of the film is clear to allow viewing of the enclosed product. Therefore, optical properties and film appearance are important for consumer appeal and sale.

This "post-pasteurization" film must perform a variety of functions well. It must be puncture resistant and have strong seals at the elevated temperatures encountered in the shrinking operation, and also with the postcooking pasteurization process. It should also keep tight conformation of the film around the product at refrigeration temperatures with an attractive appearance and act as a good barrier to oxygen, moisture and environmental contaminates.

Various polymers, blends thereof and multilayer films have been employed in attempts to address the above needs and desires of the marketplace. Copolymers of ethylene and vinyl esters such as vinyl acetate have previously been disclosed as useful materials in monolayer and multilayer thermoplastic films and are known for providing heat sealing properties.

An example of a typical fresh red meat bag currently in commerce is a film having three layers which are coextruded and oriented. The core or middle layer of the film is an oxygen and moisture barrier material, the outer layer provides abrasion resistance and is formulated to provide support for the film during the expansion of the primary tube for orientation, and the inner layer provides heat seal properties and contributes to puncture resistance.

The core or barrier layer of this film is a relatively small percentage of total film thickness and is made of polyvinylidene chloride—vinyl chloride copolymer (PVDC or VDC-VC) or vinylidene chloride—methylacrylate copolymer (VDC-MA, or MA-Saran).

The outer layer is thicker than the core layer and is a blend of very low density polyethylene (VLDPE) and EVA. VLDPE, also called ultra low density polyethylene (ULDPE) is a class of ethylene-alpha olefin copolymers having a density ranging from less than 0.915 g/cm$^3$ down to about 0.860 g/cm$^3$, and many commercial VLDPE resins are available having densities from 0.900 up to 0.915 g/cm$^3$. The EVA and VLDPE components contribute to the shrink properties of the film and the VLDPE component contributes to the abrasion and puncture resistance. The VLDPE also adds orientation strength to minimize breaks of the secondary bubble during expansion of the softened primary tube.

By far, the thickest film layer is the inner or heat seal layer. In the above film, this layer is over 60% of the total film thickness and comprises a blend of VLDPE and EVA. The heat seal layer significantly contributes to the puncture resistance of this film. Another desirable characteristic provided by this layer is the heat seal temperature range. It is preferred that the temperature range for heat sealing the film be as broad as possible. This allows greater variation in the operation of the heat sealing equipment relative to a film having a very narrow range. For example, it is desirable for a suitable film to heat seal over a temperature range of 350° F. to 550° F., providing a heat sealing window of 200° F.

Films similar to the general structure and composition as described above have been in commercial use for many years, but efforts continue to be made to increase puncture resistance while maintaining ease of processability, a broad heat seal temperature range and a high degree of both machine direction (MD) and transverse direction (TD) shrink.

Recent developments for improving properties of a heat shrinkable film include U.S. Pat. No. 5,272,016(Ralph). The '016 Patent improves properties of a multilayer nonoxygen barrier film by use of a blend of EVA, VLDPE and a Plastomer.

U.S. Pat. No. 5,635,261 (Georgelos et al) which application is hereby incorporated by reference, disclose EVA blends used for their heat sealing properties.

U.S. Pat. No. 5,397,640 (Georgelos et al) discloses a multilayer oxygen barrier film using a three component blend of VLDPE, EVA and a Plastomer. (See e.g. Example 7).

U.S. Pat. No. 5,403,668 (Wilhoit) discloses a multilayer heat shrinkable oxygen barrier film using a four component blend of VLDPE, LLDPE, EVA and Plastomer.

U.S. Pat. No. 5,759,648 (Idlas) discloses a five layer film having a $C_3C_2$ heat sealing layer, an EVOH layer, and a VLDPE surface layer connected by special adhesive blend layers. This film is particularly useful in cook-in processing and/or packaging applications.

U.S. Pat. No. 5,928,740 (Wilhoit et al) discloses a flexible film having a blend of an of ethylene alpha-olefin copolymer (EAO) having a melting point (m.p.) between 55 to 75 ° C.; a second EAO having an m.p. between 85 to 110° C.; and an unmodified thermoplastic polymer of EAO, LDPE, HDPE, or propylene copolymers, having an m.p. between 115 to 130° C. These films may be multilayer, biaxially stretched, heat shrinkable films.

Recent polymer manufacturing changes in catalysts and processes have provided increasing numbers of polymeric resins having different melting characteristics, melting points, and narrower molecular weight distributions (MWD). MWD is the ratio of $M_w/M_n$ where $M_w$ is the weight-average molecular weight of the resin and $M_n$ is the number-average molecular weight. For example, most older EAO and VLDPE resins have a MWD in the range of about 3.5 to 8.0. Improvements in catalysis technology have been able to produce many resins in which this ratio has been reduced to below 3, often in the range of about 1.5 to about 2.5 and most typically about 2.0. A narrower MWD means that the polymer chains of these resins are more uniform in length. A higher MWD resin may be said to comprise polymer chains of more varied lengths. Other changes in resin properties have been attributed to differences in comonomer distribution along an ethylene backbone resulting in materials produced from single-site catalysts having a lower melting point than a multisite catalyst produced polymer of comparable density and melt index. Also, in the case of the above-noted commercial film wherein the heat seal layer is primarily a blend of EVA and VLDPE, it was found that using a more narrow $\overline{M}_w/\overline{M}_n$ VLDPE having a lower melting point in place of a broader $\overline{M}_w/\overline{M}_n$ VLDPE having a higher melting point considerably decreased the operable heat sealing range. For example, where the sealing layer used only a very narrow $\overline{M}_w/\overline{M}_n$, lower melting point VLDPE in the blend, the heat seal temperature was in the order of 400° F. to about 475° F. giving a sealing window of only 75° F.

Past attempts at providing improved puncture resistance and heat sealing in films, while making some progress, leave much to be desired. Variability in heat sealing equipment and process parameters continue to produce bags with weak seals which are subject to tearing and stress on the seals during cutting operations, which are subject to bum through, which fail to seal through folds, and which produce leaking bags having discontinuous seals and which are not sufficiently resistant to punctures. It would be highly desirable to have biaxially stretched, heat shrinkable films and bags which are highly puncture resistant and/or whose heat sealing layer in particular and film construction in general allows greater flexibility and variability in heat sealing process parameters while producing strong, integral, continuous seals rapidly and with a lower failure rate relative to prior art films and bags.

Accordingly, one object of the present invention is to provide a novel polymeric blend having an improved combination of properties.

It is another object to provide a film of sufficient integrity to withstand the cook-in process with intact seals and film layers.

It is another object to provide a film of sufficient integrity to withstand the post-cooking pasteurization with intact seals and film layers.

Another object is to provide a flexible film having improved heat sealing properties.

Another object is to provide a heat shrinkable biaxially oriented monolayer or multilayer film having high puncture resistance and/or energy absorption.

Another object is to provide a heat shrinkable biaxially oriented monolayer or multilayer film having high puncture resistance.

Another object is to provide a heat shrinkable biaxially oriented monolayer or multilayer film having high shrinkage values.

Another object is to provide a heat shrinkable monolayer or multilayer film having an improved combination of high puncture resistance and high shrinkage values.

Yet another object is to provide a heat shrinkable, multilayer film having a puncture resistance and heat sealing range suitable for use in the packaging of fresh bone-in meats.

Yet another object is to provide a heat shrinkable, multilayer film having a combination of hot water puncture resistance and heat seal strengths suitable for use in the pasteurization processing of meats and having low haze and high gloss suitable for retail packaging.

A still further object is to provide a heat shrinkable film having an improved combination of optical and heat sealing properties, and puncture and abrasion resistance.

It is an object of the invention to provide a film for packaging foods such as turkey breasts, beef, or hams which are cooked and shipped in the same film.

It is another object of the invention to provide a process for making a processing or packaging, oxygen barrier, multilayer film having excellent optical properties, strong seals, puncture resistance in hot water and at room temperature, and high shrink values at 90° C.

The above and other objects, benefits and advantages of the invention will be apparent from the disclosure below which is exemplary and nonlimiting. It is not necessary that each and every object listed above be found in all embodiments of the invention. It is sufficient that the invention may be usefully employed.

SUMMARY OF THE INVENTION

According to the present invention, a novel biaxially stretched, heat shrinkable, thermoplastic, flexible film comprising at least one layer and suitable for use in making bags for packaging e.g. food articles such as primal and subprimal meat cuts is provided. A special inventive blend of at least three copolymers is suitable to being formed into a wide variety of articles including packaging films useful for packaging food and nonfood items alike. In its various embodiments the inventive blend may be used to fabricate inventive films of superior properties and combinations of properties relative to prior art films. These inventive films may have excellent properties relating to: heat shrinkability, optical properties, puncture and abrasion resistance, flexibility, heat sealing properties, and/or lower tear strengths, as well as good combinations of such properties. Haze values of 10% or less are achievable with various embodiments of the present invention.

The inventive film comprises a blend having a first polymer having a melting point of from 55 to 95° C., preferably 80–85° C., comprising a copolymer of ethylene and octene-1; a second polymer having a polymer melting point of from 115 to 128° C. comprising ethylene and at least one α-olefin; and a third polymer having a melting point of from 60 to 110° C. comprising an unmodified or anhydride-modified copolymer of ethylene with an alkyl acrylate, acrylic acid, methacrylic acid, or vinyl ester; and optionally a fourth polymer having a melting point of from 91 to 110° C. (preferably of from 91 to 105° C.), preferably selected from the group of ethylene homopolymers such as HDPE and LDPE, and ethylene copolymers with at least one α-olefin.

Beneficially, the present invention provides a biaxially stretched film having an improved combination of properties especially high puncture resistance values e.g. maximum puncture forces of at least 65 Newtons and often at least 90 Newtons or higher, and high shrinkage values at low temperatures of 90° C. or 80° C. e.g. at least 45% shrinkage at 90° C. in at least one, and preferably both the machine and transverse directions, and excellent optical properties. Also various embodiments of the invention may have desirable tear strengths e.g. a tear strength "x" such that $15 \leq x \leq 70$ grams per mil in either or each of the machine and transverse directions or $x < 40$ grams per mil in at least one of the machine and transverse directions, without sacrificing high shrinkage at 90° C. and other desirable properties. In some embodiments of the invention films having tear strengths of from about 15 to 35 g/mil (0.59–1.38 g/μ) in either or both of the machine and transverse direction are achieved.

Additional embodiments of the invention include films which achieve: a hot water puncture resistance using a metal probe of at least 25, preferably at least 40, most preferably at least 100 seconds at 95° C.; a hot water seal strength of at least 100, preferably at least 200, most preferably at least 300 seconds at 95° C.; a tensile seal strength of at least 400, preferably at least 600 g/cm at 88 ° C.; a maximum puncture force of at least 65 Newtons, preferably at least 80 Newtons; a shrinkage value at 90° C. of at least 40% in at least one direction; a shrinkage value at 80° C. of at least 35% in at least one direction; a haze value of less than 10%; and/or a gloss value at 45 ° of at least 70 Hunter Units; and preferably combinations of several of these properties.

A preferred four layer embodiment of the invention that is well suited for cook-in or post-cooking pasteurization processing and/or packaging has:

(a) a heat sealing surface layer of at least 50% by weight of (i) a copolymer of propene and at least one α-olefin selected from the group consisting of ethylene, butene-1, methylpentene-1, hexene-1, octene-1 and mixtures thereof having a propene content of at least 60 wt. %, or (ii) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm$^3$;

(b) a second polymeric layer having (i) from 25 to 85% of a first polymer having a melting point of 55 to 95° C. of ethylene and octene-1, (ii) from 5 to 60% of a second polymer having a melting point of 115° C. to 128° C. of ethylene and at least one $C_4$–$C_8$ α-olefin, and (iii) from 0 to 50% of an unmodified or anhydride modified third copolymer having a melting point of 60 to 110° C. of ethylene with a vinyl ester, acrylic acid, methacrylic acid, or alkyl acrylate, wherein the first and second copolymers have a combined weight percentage of at to least 50 weight percent, this weight percent being based upon the total weight of the layer;

(c) a third layer having at least 80% by weight (based on the third layer's weight) of either ethylene vinyl alcohol copolymer or at least one copolymer of vinylidene chloride with from 2 to 20 weight percent (based on said copolymer (s) weight) of vinyl chloride and/or methyl acrylate; and (d) a fourth polymeric layer having (i) from 10 to 85% of a first polymer having a melting point of 55 to 95° C. of ethylene and an alpha-olefin(preferably octene-1), (ii) from 5 to 60% of a second polymer having a melting point of 115° C. to 128° C. of ethylene and at least one $C_4$–$C_8$ α-olefin, and (iii) from 0 to 50% of an unmodified or anhydride-modified third copolymer having a melting point of 60 to 110° C. of ethylene with a vinyl ester or alkyl acrylate, wherein the combined weight percentage of the first and second copolymers is at least 50 wt. %, based upon the total weight of this layer; and wherein the film has an M.D. and/or T.D. shrinkage value at 90° C. of at least 40%, and a seal strength of at least 400 g/cm at 88° C.

Advantageously, the process of the present invention produces films and bags which are easy to make while having great resistance to puncture, excellent high shrinkage values at low (80° C.) temperatures and excellent optical properties relative to commercially available prior art films.

For example, a process for making biaxially stretched, heat shrinkable film is taught involving the steps of:

(a) extruding a melt plastified primary tube comprising e.g. 25 to 85 weight percent of a first polymer having a melting point of from 55 to 95° C. comprising at least one copolymer of ethylene and octene-1; 5 to 35 weight percent of a second polymer having a melting point of from 115 to 128° C. comprising at least one copolymer of ethylene and at least one α-olefin; and 10 to 50 weight percent of a third polymer having a melting point of from 60 to 110° C. comprising at least one unmodified or anhydride-modified copolymer of ethylene and a vinyl ester, acrylic acid, methacrylic acid, or an alkyl acrylate; wherein the first and second polymers have a combined weight percentage of at least 50 weight percent, the weight percentage being based upon the total weight of said first, second and third polymers;

(b) cooling the primary tube;

(c) reheating the cooled tube to a draw point temperature of from 68 to 88° C.; biaxially stretching said tube to a circumference of at least 2½ times the circumference of the primary tube, and (e) cooling the biaxially stretched tube to form a biaxially stretched, heat shrinkable film.

DETAILED DESCRIPTION OF THE INVENTION

Figure 1:
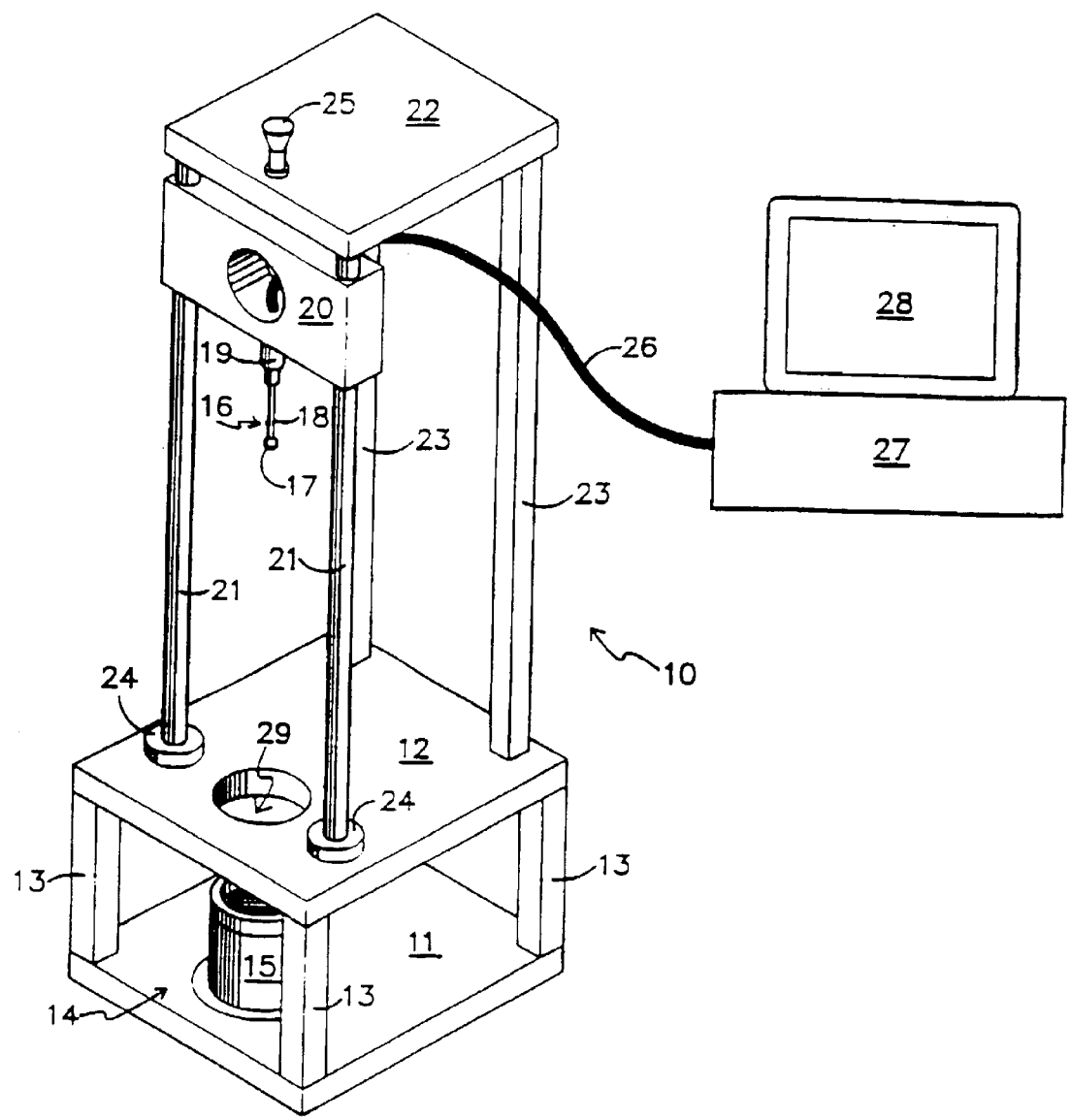
FIG. 1 is a schematic view of a ram puncture tester.

The inventive film, bag, process and package of the present invention may be used as a heat sealable, oxygen and moisture barrier film for holding a foodstuff during cooking and/or for packaging for sale a foodstuff before or after a pasteurization or cooking period. The present invention is particularly well adapted to processing and packaging pasteurized foods, and has particular utility in packaging cook-in hams, turkey breasts and beef.

"Cook-in" is the term used to indicate a film or bag in which a foodstuff is pasteurized or cooked. This film or bag is used to hold together, protect and/or form the shape of the foodstuff by a food processor (manufacturer) during the cooking or pasteurization process after which the film may be removed (sometimes termed "stripped"), or may be left on as a protective barrier during shipping, and optionally left on during retail sale.

Benefits of the inventive film include: relatively low permeability to oxygen and water vapor; high delamination resistance and unexpectedly good combinations of shrinkability, seal strengths, puncture resistance, and optical properties especially at elevated temperatures simulating cook-in conditions. The inventive films are easily oriented and may have high shrinkage values at low temperatures (90° C. or lower); superb resistance to degradation by food acids, salts and fat; sufficient residual shrink force to form and maintain a compact product; controllable meat adhesion; good to excellent sealability over a broad temperature range; low levels of extractables complying with governmental regulations for food contact; low haze; high gloss; not imparting off tastes or odors to packaged food; good tensile strength; a printable surface ; high seal strength at room temperature in atmospheric conditions and in contact with water at elevated temperatures for prolonged periods of time e.g. 30 minutes at 205° F. (96° C.), and a long lasting seal under especially demanding conditions e.g. at cook-in temperatures.

Advantageously, a preferred embodiment has low $O_2$ and water vapor permeabilities in combination with high meat adhesion which prevents undesirable cook-out of liquid during processing. In an especially preferred embodiment, the film has at least 40% (preferably 45% or higher) shrinkage values in at least one direction at 90° C. Also, the oxygen barrier properties of the inventive film reduce or eliminate losses from spoilage e.g. by rancidity due to oxidation. The inventive films and bags are particularly useful for processing and/or packaging cook-in foodstuffs, but may also be used as packaging for a wide variety of food and non-food articles.

The invention in all of its embodiments comprises or utilizes a monolayer or multilayer thermoplastic polymeric flexible film of 10 mils (254 microns) or less. The invention may be employed as bags in various typical sizes. By "flatwidth" is meant the transverse width of a flattened tubular film. The flatwidth is also equal to ½ of the circumference of the tubular film.

In certain preferred embodiments well suited for use with cook-in foods or for post-cooking pasteurization processing and packaging, the heat sealing inner layer comprises a propene-based copolymer. This layer contacts and thereby controls adhesion of the film to an enclosed food (termed e.g. "meat adhesion"), and also controls heat sealability and seal strength, particularly at elevated temperatures over time.

Typical inventive films for a variety of uses may advantageously have a thickness of about 2–3 mils (50.8–76.2 microns), although suitable films for packaging foodstuffs as thick as 5–7 mils (127–178 microns) or as thin as 1 mil (25.4 microns) may be advantageously employed. Typically, films will be between about 1.5–3.5 mil (38.1–88.9 microns). Especially preferred for use as films for packaging cook-in meats are films wherein the multilayer film has a thickness of between about 2 to 3 mils (50.8–76.2 microns). Such films have good abuse resistance. Films thinner than 2 mils are less abuse resistant and more difficult to handle in packaging processes. Films of 4–7 mils (102–178 $\mu$) have extremely good abuse resistance and puncture resistance and surprisingly good sealability. Films greater than 7 mil (178 $\mu$) may be advantageous in some demanding applications.

Preferred films are heat shrinkable. Preferred films may also provide a beneficial combination of one or more or all of the above and below noted properties including strong seals, puncture resistance, low tear strengths, low haze, high gloss, high shrinkage values at 90° C. or less, good machinability, good mechanical strength and good barrier properties including high barriers to oxygen and water permeability.

Suitable films of the present invention may have low haze and high gloss e.g. less than 20% haze and a gloss greater than 50 Hunter Units(H.U.) at 45°. Advantageously, some embodiments may have haze values of less than 10–12% and preferably less than 6%, and very high gloss values e.g. greater than 65 H. U. and preferably greater than 75 H.U.

The term "heat sealing layer" is means a layer which is heat sealable, preferably to itself, i.e., be capable of fusion bonding by conventional indirect heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough when exposed to above or below ambient temperatures during processing of food within the tube when sealed at both ends, i.e., in bag form. Finally, the bond interface between contiguous inner layers must have sufficient physical strength to withstand the tension resulting from stretching or shrinking due to the food body sealed within the tube.

Various copolymers of ethylene and at least one alpha olefin are employed in the film of the invention. The term "copolymer of ethylene" means that the copolymer is predominantly comprised of ethylene and that at least 50% by weight of the copolymer is derived from ethylene monomer units. Suitable alpha olefins include $C_3$ to $C_{10}$ alpha-olefins such as propene, butene-1, pentene-1, hexene-1, methylpentene-1, octene-1, decene-1 and combinations thereof. The invention contemplates use not only of bipolymers, but copolymers of multiple monomers such as terpolymers e.g. ethylene-butene-1-hexene-1 terpolymer, ethylene-butene-1-octene-1, or ethylene-hexene-1-octene-1 terpolymer. Terpolymer means 3 or more copolymerized monomers. The ethylene α-olefin copolymers (EAOs) used may have various molecular weights, molecular weight distributions ($\overline{M}_w/\overline{M}_n$) and melt indices. The first and second polymers used i.e. the ethylene-octene copolymer and the ethylene α-olefin copolymers will have a melt index of less than 2.5 dg/min.(ASTM D-1238, condition E 190° C.), preferably 1.5 dg/min. or less, more preferably of from 0.3 to 1.0 dg/min. Some embodiments of the invention may use a first polymer having a melt index of from 0.3 to 1.5 dg/min., while other embodiments may use first polymers having a melt index of from 1.5 to 3.0 dg. min. or higher. Advantageously the first polymer may also have a $\overline{M}_w/\overline{M}_n$ of 1.5 to 3.0, preferably of 2.2 to 2.7, but higher or lower ratio polymers may be used.

The invention in a most preferred embodiment utilizes at least three different polymers. These polymers are defined in part by their melting point. The term "melting point" means the peak melting temperature of the dominant melting phase as measured by Differential Scanning Calorimetry (DSC) with a 10° C./min. heating rate according to ASTM D-3418. Two of the required polymers of the preferred inventive blend are ethylene α-olefin copolymers and one is an ethylene copolymer with a vinyl ester acrylic acid, methacrylic acid or an alkyl acrylate. Any or all of these three polymers may be grafted with anhydride moieties or may be free of such grafts i.e. unmodified. Unless otherwise specified herein, polymers are unmodified. It is preferred that the three required polymers of the referred embodiment be present in an amount of at least 10% by weight each in the blend, and that the blend comprise at least 50% by weight of at least one layer. Where interpolymers are specified the interpolymer has at least two distinct melting points which are at least 5° C. apart and a single interpolymer may comprise two or more of the required polymers. By "interpolymer" is meant a polymer blend which has been formed in situ by a single polymerization reactor using multiple catalysts and/or process conditions or by sequential reactors using different catalysts and/or process conditions.

It is believed that the heat sealing range is improved by selecting different polymers having melting points which are at least 5–10° C. apart to provide melting characteristics over a broad temperature range which leads to a broadened heat sealing range and enhanced properties. The first and third polymers have peak melting points which are at least 5 to 17° C. apart from the second polymer.

The first polymer of the inventive film blend has a melting point of from 55 to 95 ° C., preferably of from 80 to 85° C., and comprises an ethylene octene-1 copolymer. Exemplary suitable first polymers may have a density of 0.900 g/cm³ or less, a melt index of about 2.5 or less, preferably 1.5 dg/min. or less, and most preferably of from 0.3 and 1.0 as measured by ASTM D-1238, at 190° C. under a total load of 2.16 Kg (condition E), and an $\overline{M}_w/\overline{M}_n$ of 3 or less, preferably of from 1.5 to 3.0, more preferably of from 2.2 to 2.6. In one preferred embodiment, the first polymer will advantageously have a melt index less than 1.0 dg/min. For the present invention, it is preferred that the first polymer comprises a copolymer of ethylene and octene-1 having a melt index (M.I.) of from about 0.3 and 1 (more preferably less than 1.0) dg/min.

A preferred commercially available first polymer is sold under the trademark AFFINITY VP 8770. AFFINITY is a trademark of The Dow Chemical Company, Midland, Mich., U.S.A. for their ethylene α-olefin polymers produced using metallocene single-site catalysts. These resins typically have a low level of crystallinity; 10–15% is typical.

The first polymer may comprise at least 10% and preferably 20, most preferably 25 to 85 wt. % of the total weight of the required first, second and third polymer components in the layer comprising the preferred blend, and preferably of the total polymer content of the layer. Use of lesser amounts reduces shrinkability in those embodiments where heat shrinkability is desired. Higher amounts make orientation more difficult and may increase extractable moieties to amounts which are undesirable for certain food contact applications. Various embodiments utilize the first polymer is in an amount of 25 to 45 wt. %, or 30 to 40 wt. %, or 45 to 85 wt. % based upon the total weight of the first, second and third polymers in the layer. When an optional four polymer component blend is used, the first polymer will preferably be present in an amount of about 20 to 35% based upon the weight of the layer comprising the blend.

The second polymer of the inventive blend has a melting point of 115 to 128° C. and comprises a copolymer of ethylene and at least one alpha olefin. Examples of suitable second copolymers include copolymers of ethylene and at least one $C_3$ to $C_{10}$ alpha olefin, such as $C_2C_4$, $C_2C_6$, $C_2C_8$ and $C_2C_4C_6$ copolymers, e.g. ethylene butene-1 copolymer, ethylene hexene-1 copolymer, ethylene octene-1 copolymer, and ethylene butene-1 hexene-1 copolymer. Exemplary second polymers may have a density of 0.900 g/cm³ and higher, preferably 0.900 to 0.915 g/cm³; a melt index preferably of 2.5 dg/min. or less, more preferably 0.5–1.0 dg/min.; and a $\overline{M}_w/\overline{M}_n$ of preferably about 4.0 to 5.0. Preferred second copolymers include ATTANE™ XU 61509.32, and XU 61520.01. ATTANE™ is a trademark of Dow Chemical Co. of Midland, Mich., USA for its ethylene ULDPE(VLDPE) polymers.

It is preferred that the second polymer of the inventive film comprise a copolymer of ethylene having a melt index (M.I.) of about 0.25 and 2.5 (more preferably 0.7 to 1.5) dg/min. as measured by ASTM D-1238, at 190° C. under a total load of 2.16 Kg (condition E).

The second polymer may comprise at least 5%, preferably 5 to 35 weight %, of the total weight of the first, second and third polymer components, and preferably of the total polymer content of the film layer. Use of lesser amounts reduce the heat seal temperature range. When a preferred four component blend is used, the second polymer will preferably be present in an amount of 15 to 30%, more preferably greater than 20%, based upon the total weight of the layer comprising the four polymer blend.

The third polymer of the preferred inventive blend has a melting point of 60 to 110° C. and comprises a copolymer of ethylene and a vinyl ester, acrylic acid, methacrylic acid, or an alkyl acrylate. Preferred third copolymers include copolymers of ethylene and unsaturated esters having adhesive and/or heat sealing properties. Such copolymers are predominantly (>50 wt. %) ethylene. Suitable copolymers include ethylene vinyl esters, ethylene acrylic acid copolymers, ethylene methacrylic acid copolymers and ethylene alkyl acrylates such as ethylene-vinyl acetate(EVA), ethylene-acrylic acid copolymer, ethylene-methacrylic acid, ethylene-vinyl propionate, ethylene-methyl methacrylate, ethylene-ethyl methacrylate, ethylene-ethyl acrylate, and ethylene n-butyl acrylate. Preferred copolymers are ethylene-vinyl esters such as EVA, ethylene-vinyl formate, ethylene-vinyl propionate, and ethylene-vinyl butylate. Especially preferred is EVA. Many different EVA resins are commercially available having a wide range of vinyl acetate contents and melt flow indices.

Suitable vinyl ester or alkyl acrylate contents of the preferred third polymer components used include 4–28 (preferably 4–18) wt. % vinyl ester or alkyl acrylate based on the total copolymer weight. It is preferred that the third polymer comprise a copolymer of ethylene and a vinyl ester having a melt index (M.I.) of 0.1 to 2 (more preferably 0.1 to 0.5) dg/min. as measured by ASTM D-1238, at 190° C. under a total load of 2.16 Kg (condition E).

A most preferred EVA sold as ESCORENE™ LD 701 by the Exxon Chemical Company of Houston, Tex. and reportedly has a density of 0.93 g/cm$^3$, a vinyl acetate content of 10.5 wt. %, a melt index of about 0.19 dg/min., and a melting point of about 97° C.

The third polymer may comprise at least 10%, preferably 10 to 50 wt. % of the total weight of the first, second and third polymer components, and preferably of the total polymer content of the blend film layer. Use of lesser amounts reduce heat sealing properties (in those embodiments where the blend is utilized as the heat sealing surface layer and heat sealability is desired) and use of higher amounts reduce puncture resistance and may undesirably decrease optical properties. When an optional four component blend is used, the third polymer will be present in an amount of 10 to 30% based upon the weight of the layer comprising the blend.

The optional fourth polymer is a thermoplastic polymer, preferably a copolymer of ethylene and at least one alpha olefin. Examples of suitable optional fourth polymers include copolymers of ethylene and at least one $C_3$ to $C_{10}$ alpha olefin, such as $C_2C_4$, $C_2C_6$, $C_2C_8$ and $C_2C_4C_6$ copolymers, e.g. ethylene butene-1 copolymer, ethylene hexene-1 copolymer, ethylene octene-1 copolymer, and ethylene butene-1 hexene-1 copolymer; VLDPE; LLDPE; LDPE; HDPE; and propylene copolymers (i.e. copolymers having at least 50% by weight propylene units). Exemplary suitable fourth polymers may have a density of at least 0.900 g/cm$^3$, preferably 0.900 to 0.930 g/cm$^3$, more preferably 0.900 to 0.915 g/cm$^3$; a melt index of 2.5 dg/min. or less, preferably 1.0 dg/min. or less; and a $\overline{M}_w/\overline{M}_n$ of 1.5 to 12 or more. Suitable fourth polymers that may be used in the heat sealing layer of the films of the present invention include AFFINITY™ PL 1840, PL 1880, Exceed™ 350D60 and Exact™ 3032. AFFINITY™ is a trademark of Dow Chemical Co. of Midland, Mich., U.S.A. for its ethylene polymers produced using constrained geometry catalysts. Exact™ and Exceed™ are trademarks of Exxon Chemical Co. of Houston, Tex., U.S.A. for some of their metallocene catalyst produced polymers.

Preferably the fourth polymer when present comprises 10 to 30 wt. % of the total weight of four polymer components, and preferably of the total polymer content of the polymer blend.

The above reported melt indices for the various resins employed as the first, second, third and fourth polymers are initial melt index values for the pelletized resins as received by the manufacturer. Such "as received" values are intended when the term melt index is used herein unless otherwise noted. Crosslinking, especially irradiative crosslinking, is known to increase the average molecular weight by formation of longer chains of molecules than originally present. Therefore, crosslinking will also reduce the melt index of a polymer from its initial value to a lower value since the melt index is not only a measure of viscosity but also an indirect measure of molecular weight. Also, the melt blended material will also have its own melt index which is not to be confused with that of the original copolymer components of the blend. The industry custom is that the term melt index refers to the resin (usually pelletized or powdered) as received from the polymer manufacturer unless otherwise specified.

Advantageously, the invention utilizes a polymeric blend material in at least one layer which has unexpected and surprising combinations of properties. Beneficially, such polymeric material may provide a broad combination of desirable properties having important commercial advantages for production and use of thermoplastic films, particularly biaxially stretched films having heat shrinkability properties at 90° C. Advantageously, such films have excellent puncture resistance, moderate tear propagation strength, high shrinkability, high tensile strengths, good modulus, low haze, high gloss, excellent optical properties, a broad sealing range and good seal strength. Beneficially, combinations of these desirable attributes are present in various embodiments of the invention. The blend has a sufficient film strength to withstand orientation (especially a tubular double-bubble type biaxial orientation process). The blend also resists "burn through" during heat sealing operations and produces strong fusion bonds. Such polymer blend films provide polymeric material having chain lengths suitable for diffusion and entanglement between adjacent layers during heat sealing operations to form strong integral fusion bonds.

In one embodiment the invention comprises a polymer blend of at least three copolymers comprising:

(a) 25 to 85 weight percent of a first polymer having a melting point of from 55 to 95° C. comprising at least one copolymer of ethylene and octene-1;

(b) 5 to 35 weight percent of a second polymer having a melting point of from 115 to 128 ° C. comprising at least one copolymer of ethylene and at least one α-olefin; and (c) 10 to 50 weight percent of a third polymer having a melting point of from 60 to 110° C. comprising at least one copolymer of ethylene and a vinyl ester, acrylic acid, methacrylic acid, or an alkyl acrylate;

wherein the first and second polymers have a combined weight percentage of at least 50 weight percent, the weight percentage being based upon the total weight of said first, second and third polymers.

Various embodiments of the inventive blends utilize 25 to 45 wt. % or 30 to 40 wt. % of the first polymer. These blends are capable of producing films having very good tear strength properties. Other blend embodiments of the invention use 45 to 85 wt. % of the first polymer. These embodiments are capable of producing films having exceptionally high puncture resistance values, especially high maximum puncture forces and total energy absorption values. Advantageously one or more of the first, second and third polymers may comprise an interpolymer. In particular, an interpolymer of the first and second polymers may be used. This interpolymer which combines the first and second polymers would have at least two melting points, one melting point of from 55 to 95° C. and a second melting point of from 115 to 128° C.

The blend may contain other components e.g. other polymers and/or processing aids. Preferably, the blend of the first, second, and third polymers will comprise at least 50% by weight of a total blend of which it is a part. Thus, a film layer comprising the inventive blend will advantageously have at least 50 wt. % of the layer comprise the aforementioned first, second, and third polymers, although various embodiments may use less than 50%.

In another embodiment, the above blend is used to produce flexible films which may be e.g. blown, cast, tentered or stretched either uniaxially or biaxially. These films may be fabricated into bags or shirred as tubes. The inventive film layer may be irradiatively crosslinked by known methods. It may also be the innermost heat sealable layer of a tubular film.

Yet another embodiment uses the above blend to produce flexible, thermoplastic, biaxially stretched, heat shrinkable films. These heat shrinkable films may beneficially have a ram puncture force of at least 65, preferably at least 70 Newtons, a ram puncture stress of at least 100 MPa, a total energy absorption of at least 0.60 Joule, preferably at least 0.70 Joule, and most preferably at least 0.90 Joule, and/or a tear strength "x" such that 10≦x≦50 grams per mil in each of the machine and transverse directions or x<40 grams per mil in at least one of the machine and tansverse directions (as measured by the Elmendorf Tear Strength Test).

In another embodiment a film having at least one layer comprising the inventive blend is made having at least one additional thermoplastic layer, and in a preferred embodiment has at least three or four additional layers. These additional layers may be added in sheet or tubular form and may be produced by known multilayer fabrication techniques including coating lamination or coextrusion. In one embodiment at least one additional layer comprises a polymer blend of at least three copolymers having an ethylene -α-olefin copolymer (EAO) "A" having a melting point between 55 to 75° C.; an EAO "B" having a melting point between 85 to 110° C.; and a thermoplastic polymer e.g. EVA having a melting point between 115 to 130° C. This additional layer is further described in PCT Application No. U.S. 98/03914 entitled "Thermoplastic $C_2$-α-Olefin Copolymer Blends and Films" filed Feb. 27, 1998 claiming a U.S. priority Ser. No. 08/808,093, filed Feb. 28, 1997, now U.S. Pat. No. 5,928,740 which applications and disclosures are hereby incorporated by reference in their entireties.

The inventive blend will find utility as the innermost heat sealing layer of a tubular film in many multilayer embodiments. Films having 3 to 5 or more layers with at least one layer comprising the blend are contemplated, especially films having a layer comprising at least 50 percent by weight of copolymer of ethylene with at least one alpha-olefin or at least one vinyl ester or blends thereof, and/or a layer comprising a vinylidene chloride copolymer, a nylon or a copolymer of ethylene with a vinyl alcohol. In a preferred three, four or five layer embodiment, an oxygen barrier layer of a vinylidene chloride copolymer, a nylon or a copolymer of ethylene with a vinyl alcohol is between the inventive layer and either a layer comprising at least 50 percent by weight of copolymer of ethylene with at least one alpha-olefin or at least one vinyl ester or blends thereof, or another layer comprising the inventive blend.

Films having exceptionally high puncture resistance values, especially high maximum puncture forces and total energy absorption values may be produced according to the present invention. Maximum ram puncture forces of at least 65 to 70 to 90 to 100 Newtons or higher, preferably at least 110 Newtons may be achieved in films of the invention. Inventive films having maximum ram puncture stress values of at least 110 MPa, preferably at least 140 MPa, and more preferably at least 200 MPa may be achieved. Also, inventive films having total energy absorption values (at maximum puncture force) of at least 0.50 Joules, preferably at least 0.60, more preferably at least 0.70 or at least 0.80 Joules, beneficially at least 0.90 Joules, and most preferably at least 1.0 Joules may be achieved.

Polymers of broad molecular weight or which are polymodal in molecular weight distribution are contemplated, as are blends having very narrow molecular weight distributions.

An advantage of the present invention is that use of the presently disclosed blends facilitates a broad heat sealing range and enhances biorientability for irradiated films.

Upon exposure to irradiation sufficient to cause cross-linking, heat sealable layers tend to diminish in their heat sealing ability. However, an antioxidant may be added to the heat sealable inner layer of the tubular article to inhibit cross-linking within the polymer, thereby reducing the adverse effects of over-irradiation upon the heat sealing properties. Addition of an antioxidant further allows the irradiation dosage to be sufficiently high for other layers of a multilayer film to retain the beneficial effects of irradiation. Films may be crosslinked by chemical agents or by irradiation, preferably at a level between 1 and 10 Mrad, more preferably 2–6 Mrad.

As generally recognized in the art, resin properties may be modified by blending in additional resins or additives such as colorants, processing aids, antiblock agents and slip agents, etc. The specific polymer blends described above may be further blended with additional resins such as very low density polyethylene (VLDPE), linear low density polyethylene (LLDPE), low density polyethylene (LDPE), high density polyethylene (HDPE), ionomers, polyamides, polypropylenes, ethylene acrylates or esters, various olefinic polymers or copolymers, adhesive resins; or may be formed into multilayer films with one or more additional layers of such resins or blends thereof.

The resins and others may be mixed by well known methods using commercially available tumblers, mixers or blenders. Also, if desired, well known additives such as processing aids, slip agents, antiblocking agents, pigments, and mixtures thereof may be incorporated into the film into any or all layers.

In one embodiment of the present invention a polymeric film layer is provided which comprises a blend of:

(a) a first polymer having a melting point of from 55 to 95° C., preferably 80 to 85° C., which comprises a copolymer of ethylene and octene-1;

(b) a second polymer having a melting point of from 115 to 128 ° C. which comprises a copolymer of ethylene and at least one α-olefin; and (c) a third polymer having a melting point of from 60 to 110° C. which comprises a copolymer of ethylene and a vinyl ester (preferably 4 to 18% by wt. of said copolymer), acrylic acid (preferably 4 to 30% by wt. of said copolymer), methacrylic acid or an alkyl acrylate; and when the first polymer has a melting point greater than 92 ° C., the blend may otherwise be: i) free from ethylene a-olefin copolymers having a melting point less than 90° C. or of from 55 and about 85° C.; ii) have less than 30% by wt. of ethylene α-olefin copolymers having a melting point less than 90° C. or of from 55 and about 85° C.; iii) have greater than 50% ethylene α-olefin copolymers having a melting point less than 90° C. or of from 55 and about 85 ° C.; or iv) have from 30% to 50% a ethylene α-olefin copolymers having a melting point less than 90° C. or of from 55 and about 85° C., based upon the total weight of the blend layer.

In a preferred process for making films, the resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. For example, according to the present invention, in extrusion or coextrusion of the polymer blends of the invention, barrel and die temperatures may range between about 140° C. and 185° C. However, variations are expected which may depend upon such factors as variation of polymer resin selection, use of other resins e.g. in the blend or in separate layers in a multilayer film, the manufacturing process used, and particular equipment and other process parameters utilized. Actual process parameters including process temperatures are expected to be set by one skilled in the art without undue experimentation in view of the present disclosure.

Blends of the present invention may be manufactured into various useful articles e.g. cast films using e.g. a slot die followed by tentering to achieve biaxial orientation, or tubular films using an annular die followed by trapped bubble expansion to achieve biaxial stretching. In a preferred embodiment, extrusion by a trapped bubble or double bubble to process of the type described in U.S. Pat. No. 3,456,044 is used. In a preferred process for making an oriented or heat shrinkable film, a primary tube comprising the inventive plastic blend is extruded, and after leaving the die is inflated by admission of air, cooled, collapsed, and then preferably oriented by reinflating to form a secondary bubble with reheating to the film's orientation (draw) temperature range. Machine direction (M.D.) orientation is produced by pulling or drawing the film tube e.g. by utilizing a pair of rollers traveling at different speeds and tnansverse direction (T.D.) orientation is obtained by radial bubble expansion. The oriented film is set by rapid cooling. Advantageously, machine direction and transverse direction stretch ratios are from about 3:1 to about 5:1 with a ratio of about 4:1 preferred. Films of various embodiments of the present invention may have shrinkage values at 90° C. of up to 45% or higher in either or both the machine and trasverse directions. Some preferred films have at least 45% shrinkage values at 90° C.

Films of the present invention may be monolayer or multilayer films preferably of 10 mils or less, more preferably of 5 rmil or less. Multilayer films have the following preferred layer thicknesses.

The thickness of the heat sealable inner thermoplastic first layer is typically of from about 0.2 and about 2.0 mils (5–51 $\mu$). Thinner layers may perform the aforedescribed functions, particularly in structures of 5 or more layers.

In gas barrier films (generally providing a barrier to oxygen transmission), the barrier layer thickness is preferably from 0.1 to 0.5 mils (2.5–12.7 $\mu$). Thinner barrier layers may not perform the intended functions and thicker layers do not appreciably improve performance. As used herein the term "barrier layer" means "an oxygen gas barrier layer" unless otherwise specified.

In one barrier layer embodiment of this invention the outer thermoplastic layer of the enclosing multilayer film is on the opposite side of the core layer from the inner layer, and in direct contact with the environment. In a preferred three layer embodiment this outer layer is directly adhered to the core layer. Since it is seen by the user/consumer, it should enhance optical properties of the film. Also, it must withstand contact with sharp objects and provide abrasion resistance so it is often termed the abuse layer.

The outer layer is preferably formed of a similar blend to that of the inner layer so that both such layers utilize the first, second and third polymers defined above, preferably a blend of: (i)EVA; (ii)an EAO (such as VLDPE); and (iii)an ethylene-octene-1 copolymer having a melting point of from 55 to 95° C., preferably 80 to 85° C. The three polymers each typically comprises 20 to 40% by weight of the layer. EVA when used in the outer layer preferably has between about 3 wt. % and about 18 wt. % vinyl acetate content to provide good shrinkability. Blends of EAOs are also usefully employed in the outer layer.

Alternatively, the inner, outer, or intermediate layers may be formed of other thermoplastic materials, for example, polyamides, styrenic copolymers e.g. styrene-butadiene copolymer, polypropylenes, ethylene-propylene copolymers, ionomers, or alpha-olefin polymers and in particular members of the polyethylene family such as linear low density polyethylene (LLDPE), very low density polyethylene (VLDPE and ULDPE), HDPE, LDPE, ethylene vinyl ester copolymer, ethylene acrylic acid copolymer, ethylene methacrylic acid copolymer, or ethylene alkyl acrylate copolymer or various blends of two or more of these materials.

The thermoplastic outer layer thickness is typically 0.5 to 1.0 mils. Thinner layers may be less effective for abuse resistance, however thicker layer though more expensive may advantageously be used to produce films having unique highly desirable puncture resistance and/or abuse resistance properties. Heavy gauge films, typically 5 to 7 mils or more, are needed in demanding applications which are usually satisfied by very expensive and complex laminated film structures and/or secondary packaging materials such as bone guards, pads, and overwrap.

Unless otherwise noted, the following physical properties are used to describe the present invention, films and seals. These properties are measured by either the test procedures described below or tests similar to the following methods.
Average Gauge: ASTM D-2103
Tensile Strength: ASTM D-882, method A
1% Secant Modulus: ASTM D-882, method A
Oxygen Gas Transmission Rate ($O_2$GTR): ASTM D-3985-81
Elmendorf Tear Strength: ASTM D-1922
Percent Elongation at Break: ASTM D-882, method A
Molecular Weight Distribution: Gel permeation chromatography
Gloss: ASTM D-2457, 45° Angle
Haze: ASTM D-1003-52
Melt Index: ASTM D-1238, Condition E (190° C.) (except for propene-based (>50% $C_3$ content) polymers tested at Condition L(230° C.))
Melting Point: ASTM D-3418, peak m.p. determined by DSC with a 10° C./min. heating rate.
Vicat Softening Point (Vsp): ASTM D-1525-82
All ASTM test methods noted herein are incorporated by reference into this disclosure.
Shrinkage Values Shrinkage values are obtained by measuring unrestrained shrink of a 10 cm square sample immersed in water at 90° C. (or the indicated temperature if different) for ten seconds. Four test specimens are cut from a given sample of the film to be tested. The specimens are cut into squares of 10 cm length M.D. by 10 cm. length T.D. Each specimen is completely immersed for 10 seconds in a 90° C. (or the indicated temperature if different) water bath. The specimen is then removed from the bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. The shrinkage of 4 specimens is averaged and the average M.D. and T.D. shrinkage values reported. The term "heat shrinkable film at 90° C." means a film having an unrestrained shrinkage value of at least 10% in at least one direction at 90° C.

Shrink Force

The shrink force of a film is that force or stress required to prevent shrinkage of the film and was determined from two samples taken from each film. Each film sample was cut 1" (2.54 cm) wide by 7" (17.8 cm) long in the machine direction and 1" (2.54 cm) wide by 7' (17.8 cm) long in the transverse direction. The average film thickness was determined and recorded. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was recorded. At the end of this time, the film sample was removed from the bath and allowed to cool to room temperature whereupon the force in grams at room temperature was also recorded. The shrink force for the film sample was then determined from the following equation wherein the results is obtained in grams per mil of film thickness (g/mil):

$$\text{Shrink Force }(g/mil) = F/T$$

wherein F is the force in grams and T is the average thickness of the film samples in mils.

Impulse Seal Range

The impulse sealing range test determines the acceptable voltage ranges for impulse sealing plastic films. A Sentinel Model 12-12AS laboratory sealer manufactured by Packaging Industries Group, Inc., Hyannis Massachusetts, U.S.A. was used. This impulse sealer is equipped with a replacement sealing ribbon (available from Koch Supplies of Kansas City, Mo.) for a Multivac AG100 brand packaging machine. In this test, two 4 inch wide (T.D. direction) samples are cut from a tubular film. The impulse sealer has controls for coolant flow, impulse voltage and time, and seal bar pressure. These controls except for impulse voltage are set at the following conditions:

- 0.5 seconds impulse time (upper ribbon only)
- 2.2 seconds cooling time
- 50 psi (345 kPa) jaw pressure
- 0.3 gallon per minute (1 liter per minute) of cooling (about 75° F. (22° C.)) water flow One of the samples is folded in half for use in determining a minimumn sealing voltage. This folding simulates folding which may inadvertently occur during conventional bag sealing operations. The folded sample which now has four sheets or portions of film (hereinafter referred to as "sheet portions") is placed into the sealer and by trial and error the minimum voltage to seal the bottom two sheet portions to each other was determined.

The maximum voltage is determined by placed 2 sheet portions in the sealer and activating the seal bar. The film sample is manually pulled with about 0.5 lbs. of force and the voltage which does not cause burn through or significant distortion of the seal is determined.

Hot Water Seal Strength (HWSS) Test

In commercial use, food packaging bags are filled with food product, e.g. poultry, then evacuated through the mouth end of the bag and sealed, e.g., by an impulse sealing machine. The strength of seals of heat shrinkable bags is measured by determining the time for a seal to fail when under certain conditions the seal is immersed in hot water e.g. at 95° C. The HWSS test is designed to test the seal integrity of a bag's seals by simulating a bagged food shrinking and/or cooking packaging application. The hot water seal strength is measured by a test described as the "restrained shrinkage-seal strength test" in Funderburk et al U.S. Pat. No. 3,900,635 which patent is hereby incorporated by reference. The seal strength of the sealed test bags is determined using a metal frame fabricated from wire to simulate the contours of a bulky food such as whole poultry, and the frame is placed inside the test bag. The so-opened bag and test frame is then immersed in water at 95° C.±0.5° C. with the seal at the bottom end, and the time to failure of the seal was measured for ten bags and the average is reported along with the minimum and maximum time to failure. Times are measured in seconds up to a maximum of 300 seconds. After 300 seconds, the test of each sample was discontinued regardless of failure and averages were calculated using 300 seconds for intact bags. The maximum and minimum sealing temperatures for which bags may be effectively sealed is determined by trial and error to provide information about the sealing range over which test bags may be sealed. A wide sealing range is desirable to minimize operator error and seal failure due to e.g. drift of temperature control and environmental conditions and other process variations such as e.g. film thickness.

Tensile Seal Strength (Seal Strength) Test

Five identical samples of film are cut 1 inch (2.54 cm) wide and at least 5 inches (77 cm) long with a 1 inch (2.54 cm) wide seal portion centrally and transversely disposed. Opposing end portions of a film sample are secured in opposing clamps in a temperature controlled chamber of an Instron 4501 Universal Testing Instrument. The film is secured in a taut snug fit between the clamps without stretching prior to beginning the test. The test chamber door is closed and the chamber is heated to the test temperature at which time the instrument is activated to pull the film via the clamps transverse to the seal at a uniform rate of 5 inches (127 cm) per minute until failure of the film (breakage of film or seal, or delamination and loss of film integrity). The test temperature and lbs. force at break are measured and recorded. it The test is repeated for four additional samples and the average lb. at break reported.

Hot Water Puncture Test

Hot water puncture values are obtained by a hot water puncture test as follows. Water is heated to 95±° C. A straight stainless steel metal rod of ⅜ inch (0.95 cm) diameter is formed into a probe by shaping one end to a conical point. This sharpened point has the configuration of a right circular cone, and the angle between the cone axis and an element of the conical surface at the vertex is 37°. This sharp point is then rounded to a spherical tip of about 1/16 inch diameter. The pointed rod is fastened to a wooden block so that the rounded point projects 1 ½ inches (3.8cm) beyond the end of the 7 inch (17.8 cm) long rectangular wooden block. A specimen about 3 inches (7.6 cm) wide in the transverse direction (TD) and about 18 inches (45.7 cm) long is cut from the test sample material. One end of the specimen is placed on the end of the wooden block opposite the pointed rod. The specimen is wrapped around the end of the sharpened rod and back to the wooden block on the opposite side, where it is secured. The film thickness in the area of contact with the sharpened rod is measured in order to assure that the film specimen thickness is truly representative of the given test sample material. The specimen and pointed rod are quickly immersed five inches (12.7 cm) into the hot water and a timer is started. The timer is stopped when the point punctures the film specimen or at 120 seconds without puncture. and the time recorded. The test procedure is repeated 5 more times with new specimens. The times required for penetration are then averaged for the six TD specimens. Resistance to puncture times of below 6–7 seconds are generally considered unacceptable, while times of 20 seconds or more are good, 60 seconds or more are very good and 120 seconds or more are excellent.

Ram Puncture Test

The ram puncture test is used to determine the maximum puncture load or force, and the maximum puncture stress of a flexible film when struck by a hemispherically shaped striker. This test provides a quantitative measure of the puncture resistance of thin plastic films. Values of this test will differ from those generated by a dynamic puncture test due to differences in striker geometry, loading rate and geometry and available energy.

Referring to FIG. 1, a schematic drawing (not to scale) of a ram puncture tester 10 is depicted having a base 11 and a shelf 12 separated by fixed pillars 13 forming a sample placement area 14.

In conducting the ram puncture test, an approximately 5 inch (12.7 cm) diameter film sample is obtained and its thickness measured and recorded. This sample is clamped in place across an approximately 3 inch (7.6 cm) diameter circular opening in a ring fixture 15 by holding the film sample taut, but not stretched, between the planar circular ring fixture 15 having a compressive O-ring and an opposing metal ring to secure the film in a circle. This fixture 15 is positioned to hold the film plane perpendicular to the path of striker 16 located above the film. The striker 16 travels downward in the direction of and under the influence of the gravitational force of the Earth. The striker 16 is a 3.95 mm diameter steel ball 17 welded to a 5 cm long steel shaft 18 of 95 mil (0.24 cm) diameter. The shaft is attached to a 50 lb full-scale Dytran™ piezoelectric load cell 19 (available from Dytran Instruments, Inc., U.S.A.) which is affixed to an aluminum crosshead 20. The crosshead assembly forms a 3.00 kg mass which travels vertically, under the influence of gravity, along 2 hardened steel guide shafts 21 which are held in a fixed spaced apart position parallel position by attachment to shelf 12 at the bottom and top plate 22 at the top. Back pillars 23 provide stability to the tester 10. Four linear bearings are press-fit into the crosshead to provide precise, repeatable, low-friction travel along the guide shafts 21 downward to shock absorber pads 24. The striker 16 may be actuated by latch release knob 25, and load cell information is passed via line 26 to a low impedance voltage mode (LIVM)(power supply not shown) which is connected to a data acquisition system in computer 27 having a monitor 28. Shelf 12 has a circular opening 29 permitting striker 16 to contact the film sample contained in fixture 15.

Figure 2:
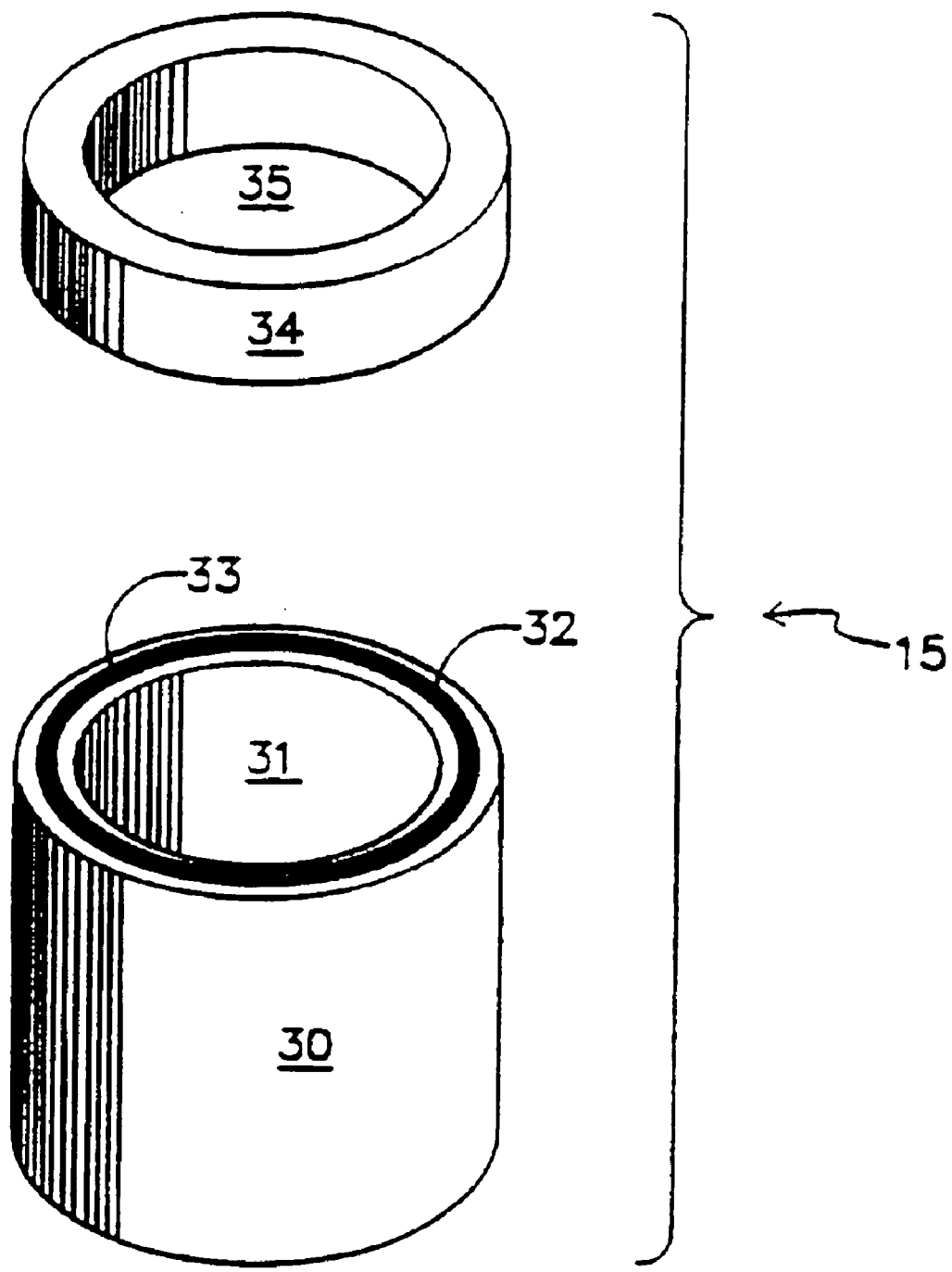
FIG. 2 is an exploded view of a specialty film holder.

Referring now to FIG. 2, films are tested by circumferentially clamping them over a 3" diameter hole using a specialty film holder fixture 15. The film holder 15 is an aluminum tube 30 having a circular opening 31. The tube 30 has a circular machined groove 32 to accept a rubber O-ring 33 at one end. The film (not shown) is placed across the O-ring 33 and a mating upper cylindrical section 34 having an opening 35 is firmly held without stretching against the film by clamps (not shown). The clamped film is then centered underneath the puncture tip at the base of the drop tower (see FIG. 1). This places the plane of the film surface 28.4 cm below the tip of the hemispherical striker tip 17 (drop height). The crosshead 20 is released and propelled by gravity toward the clamped film at a velocity $v_0$ which is kinematically related to the drop height.

Figure 3:
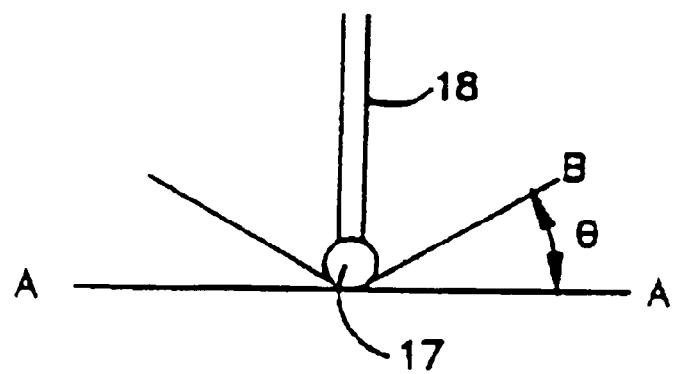
FIG. 3 is a schematic view depicting geometry of striker impact with film.

Referring now to FIG. 3, when the striker shaft 18 pulls the striker tip 17 into contact with the film, the film deforms from plane A—A and resists the impact force through uniform multidirectional tensile stresses across the thickness of the film. The angle of deflection of the film theta ($\theta$) is defined by the angle between the clamped film in the clamped position (plane A—A) and that of the stretched film (indicated as position B—B) at the peak puncture load recorded during impact. This angle is always less than 90°. It is automatically measured and recorded by a data acquisition system in the computer (see FIG. 1). The load cell force output is recorded at a frequency of 300 kHz beginning at roughly 1 msec. prior to impact and as the striker impacts, penetrates, and punctures the film sample. Assuming that the membrane stresses are in the plane of the film (no bending stresses), and that the measured load depends upon the geometry of the striker, then the maximum stress $\sigma$ may be determined by the following equation: $\sigma_{max}=P_{max}/(2\pi rT \sin \theta)$, where $P_{max}$=maximum force or load; r =radius of the circle circumscribed by the circular cross-section of the hemispherical striker as it is superimposed on the plane of the film; T=the undeformed film thickness; $\sin \theta$ is the sine of the angle between the plane of the sample holder and the fully deflected film sample at the moment of puncture. The Total Energy Absorption "E" may be calculated by integrating the load displacement curve according to the following equation:

$$E = v_0 \int_0^t P dt + g \int_0^t tP dt - \frac{1}{2m}\left[\int_0^t P dt\right]^2$$

Where E is the total energy; $v_0$ is the striker speed at the moment of impact with the film sample; P is the force; t is the time from impact of the striker with the film until puncture of the film; g is gravitational acceleration; and m is the mass of the crosshead including the striker. The test is repeated and an arithmetic mean is reported for 4 samples. If necessary, the equipment dimensions such as the drop height, striker shaft length and/or mass of the crosshead assembly may be increased to test films that are resistant to puncture with the above dimensioned test apparatus. The above equations remain the same.

Following are examples and comparative examples given to illustrate the invention.

In all the following examples, unless otherwise indicated, the film compositions were produced generally utilizing the apparatus and method described in U.S. Pat. No. 3,456,044 (Pahike) which describes a coextrusion type of double bubble method and in further accordance with the detailed description above. In the following examples, all layers were extruded (coextruded in the multilayer examples) as a primary tube which was cooled upon exiting the die e.g. by spraying with tap water. This primary tube was then reheated by radiant heaters(although in the present invention alternative heating means such as conduction or convection heating may be used) with further heating to the draw (orientation) temperature for biaxial orientation accomplished by an air cushion which was itself heated by transverse flow through a heated porous tube concentrically positioned around the moving primary tube. Cooling was accomplished by means of a concentric air ring. Draw point temperature, bubble heating and cooling rates and orientation ratios were generally adjusted to maximize bubble stability and throughput for the desired amount of stretching or orientation. Use of higher throughput rates and lower draw point temperatures are believed to provide films having higher puncture resistance relative to use of lower throughputs or higher orientation temperatures. All percentages are by weight unless indicated otherwise.

EXAMPLES 1–7

In Examples 2, 3, and 5–7 biaxially stretched, heat shrinkable, monolayer films of the present invention were made and their physical properties tested. Examples 1 and 4 are comparative examples of a biaxially stretched, heat shrinkable, monolayer film not of the present invention.

For Comparative Example 1, thermoplastic resins generally in pellet form were mixed together to form a blend of: 35.0 wt. % of a first polymer comprising a copolymer predominantly of ethylene with octene-1 monomer and having a reported density of about 0.902 g/cm$^3$, a melt index of 1.0 dg/min., a melting point of 100° C. which is available under the trademark Affinity PL1880 from Dow Chemical Company of Midland, Mich., U.S.A.; a second polymer comprising 25.0 wt. % of an ethylene-α-olefin copolymer of very low density polyethylene sold by Dow Chemical Company of Midland, Mich., U.S.A. under the trademark Attane XU 61509.32 which is a copolymer of ethylene and octene-1 reportedly having a melt index of about 0.5 dg/min and a density of about 0.912 g/cm$^3$, and a melting point of about 122–123° C.; and a third polymer comprising 38.0 wt. % of a copolymer of ethylene and vinyl acetate(EVA) available from Exxon Chemical Company of Houston Tex., U.S.A. under the trademark Escorene LD 701.06 and having the following reported properties: 10.5% vinyl acetate content, 0.93 g/cm$^3$ density, 0.19 dg/min. melt index, and a melting point of about 97° C.; 2.0% by weight of a slip processing aid sold under the trademark TM 11384E118 by Techmer PM of Clinton, Tenn., U.S.A.

The blended resins were melt plastified in an extruder and a monolayer thermoplastic tube was extruded. Due to equipment availability three extruders and a three layer die was used, but all layers had the same composition thereby three identical layers were coextruded together to produce a monolayer film. The extruder barrel and extrusion die temperature profile was set at about 330° F. (166° C.). The extruded primary plastic tube was then cooled, reheated, biaxially stretched, and cooled according to a double bubble process and the resultant biaxially stretched film wound on a reel. The machine direction (M.D.) draw or orientation ratio was about 4.5:1 and the transverse direction (T.D.) bubble or orientation ratio was about 4.0:1. The draw point or orientation temperature is below the melting point for the layer to be oriented and above that layer's Vicat softening point. The draw point temperature of the films of Examples 1–7 are believed to have been about 160 to 175° F. (71–79° C.). A second comparative film, Example 4, was similarly made except as noted below. The film of Example 4 was a blend of 70.0 wt. % of the first polymer (Affinity PL1880); 14.0 wt. % of the second polymer (Attane XU61509.32); 14.0 wt. % of the third polymer (Escorene LD 701.06); and 2.0 wt. % of the processing aid (TM 11384E118). The processing and orientation conditions were similar to those above except that the M.D./T.D. orientation ratios were about 4.5:1 and 3.7:1, respectively.

Examples 2, 3, and 5–7 were all films of the invention and were made as described above for Example 1 with similar processing and orientation conditions except as noted below.

Example 2 was a blend of 35.0 wt. % of a first polymer comprising a copolymer predominantly of ethylene with octene-1 monomer and having a reported density of about 0.895 g/cm$^3$, a melt index of 1.6 dg/min., a melting point of 95° C. which is available under the trademark Affinity PF 1140 from Dow Chemical Company of Midland, Mich., U.S.A.; 25.0 wt. % of a second polymer comprising Attane XU 61509.32; 38.0 wt % of a third polymer comprising Escorene LD 701.06; and 2.0 wt. % of the processing aid (TM 11384E118). The M.D./T.D. orientation ratios were about 4.5:1 and 4.0:1, respectively.

Example 3 was a blend of 35.0 wt. % of a first polymer comprising a copolymer predominantly of ethylene with octene-1 monomer and having a reported density of about 0.884 g/cm$^3$, a melt index of 1 dg/min., a melting point of 83° C. with a minor shoulder peak at 72° C. which is available under the trademark Affinity VP 8770 from Dow Chemical Company of Midland, Mich., U.S.A.; 25.0 wt. % of a second polymer comprising Attane XU 61509.32; 38.0 wt. % of a third polymer comprising Escorene LD 701.06; and 2.0 wt. % of the processing aid (TM 11384E118). The M.D./T.D. orientation ratios were about 4.6:1 and 3.5:1, respectively.

The film of Example 5 was a blend of 70.0 wt. % of a first polymer comprising Affinity PF 1140; a second polymer comprising 14.0 wt. % of Attane XU 61509.32; a third polymer comprising 14.0 wt. % of Escorene LD 701.06; and 2.0 wt. % of the processing aid (TM 11384E118). The M.D./T.D. orientation ratios were about 4.8:1 and 3.8:1, respectively.

Example 6 was a blend of 70.0 wt. % of a first polymer comprising Affinity VP 8770; 14.0 wt. % of a second polymer comprising Attane XU 61509.32; 14.0 wt. % of a third polymer comprising Escorene LD 701.06; and 2.0 wt. % of the processing aid (TM 11384E118). The M.D./T.D. orientation ratios were about 4.6:1 and 3.0:1, respectively.

The film of Example 7 was a blend of 70.0 wt. % of a first polymer comprising Affinity VP 8770; 14.0 wt. % of a second polymer comprising a copolymer predominantly of ethylene with octene-1 monomer and having a reported density of about 0.906 g/cm$^3$, a melt index of 0.8 dg/min., a melting point of 122–123° C. which is available under the trademark Attane 4203 from Dow Chemical Company of Midland, Mich., U.S.A.; 14.0 wt. % of a third polymer comprising a copolymer of ethylene and vinyl acetate(EVA) available from Exxon Chemical Company of Houston Tex., U.S.A. under the trademark Escorene LD 705 and having the following reported properties: 13.3% vinyl acetate content, 0.935 g/cm$^3$ density, 0.4 dg/min. melt index, a Vicat softening point of 77° C., and a melting point of about 92° C.; and 2.0 wt. % of the processing aid (TM 11384E118). The M.D./T.D. orientation ratios were about 4.6:1 and 2.8:1, respectively.

The resultant films were tested for various physical properties and these properties are listed in Table 1 below.

TABLE 1

| Ex. No. | AVG. GAUGE mil ($\mu$) | GLOSS at 45° Angle | HAZE % | RAM PUNCTURE | | | SHRINK at 90° C. % MD/TD | SHRINK at 80° C. % MD/TD | TEAR STRENGTH g/mil (g/$\mu$) MD/TD |
|---|---|---|---|---|---|---|---|---|---|
| | | | | Force Newtons | Stress MPa | Total Energy Joules | | | |
| 1 | 2.34 (59.4) | 77 | 1.2 | 91 | 249 | 0.92 | 31/39 | 16/25 | 17/24 (0.67/0.94) |

TABLE 1-continued

| Ex. No. | AVG. GAUGE mil ($\mu$) | GLOSS at 45° Angle | HAZE % | RAM PUNCTURE | | | SHRINK at 90° C. % MD/TD | SHRINK at 80° C. % MD/TD | TEAR STRENGTH g/mil (g/$\mu$) MD/TD |
|---|---|---|---|---|---|---|---|---|---|
| | | | | Force Newtons | Stress MPa | Total Energy Joules | | | |
| 2 | 2.34 (59.4) | 88 | 1.7 | 87 | 229 | 0.86 | 43/50 | 23/32 | 30/40 (1.18/1.57) |
| 3 | 2.42 (61.5) | 88 | 1.5 | 80 | 210 | 0.90 | 52/54 | 28/37 | 39/44 (1.54/1.73) |
| 4 | 2.20 (55.9) | 91 | 1.0 | 103 | 292 | 1.07 | 29/39 | 14/25 | 45/43 (1.77/1.69) |
| 5 | 2.41 (61.2) | 91 | 1.2 | 92 | 234 | 1.14 | 55/57 | 35/40 | 37/47 (1.46/1.85) |
| 6 | 2.92 (74.1) | 85 | 2.0 | 57* | 123 | 0.71* | 62/59 | 50/50 | 59/67 (2.32/2.64) |
| 7 | 2.60 (66.0) | 87 | 1.4 | 67* | 143 | 0.90* | 66/66 | 54/54 | 50/51 (1.97/2.01) |

*Film did not puncture but stretched until the crosshead assembly contacted the shock absorber pads.
Force and Total Energy represent values obtained at maximum deformation of film reached at the point of contact of the crosshead assembly with the shock absorber pads.

From the properties measured and listed in Table 1 we see that the inventive films of Examples 2, 3, and 5–7 have excellent commercially acceptable optical properties i.e. high gloss values and low haze, which are comparable to those measured for the comparative films of Examples 1 and 4. Also, the inventive films have significantly higher shrinkage values at both 90° C. and 80° C.

The inventive films also have very good puncture resistance properties although slightly less than for the comparative examples.

Referring now to specific comparisons, the film formulations of comparative example 1 and example 2 (of the invention) were identical except that the composition of the first polymer of the comparative example 1 differed from the first polymer of inventive example 2. The comparative example used an ethylene octene-1 copolymer having a higher melting point, slightly higher density, and lower melt index. The orientation conditions were similar. Use of the lower melting point, lower density material resulted in production of a film having greatly superior shrinkage values at 90° C. and also at lower temperatures such as 80° C. Inventive example 2 had measured 90° C. shrinkage values that were 28 to 39% higher than the comparative example 1; the 80° C. shrinkage values were 28 to 44% higher. For example 2, the gloss values were significantly higher, and the ram puncture resistance maximum force was slightly lower (5%). The total energy absorbed at maximum force was about 25% lower for the inventive film, but this was a very good value nonetheless. Tear propagation strengths as measured by the Elmendorf Tear Strength Test were higher for the inventive film, but acceptable for commercial applications. Lower tear propagation strengths are an advantage in heat sealing operations using impulse sealing technology where the sealing apparatus both seals and cuts the film with the film trim being removed by tearing along the cut. Lower tear propagation strengths enable the trim to be removed quickly and without damage to the seal or film.

Example 3 of the invention was similar to comparative Example 1 except that the composition of the first polymer was changed by substituting an ethylene octene-1 copolymer having a lower (0.884 g/cm$^3$) density, and lower (83° C.) melting point. The amounts of first polymer in the blend remained the same. The results were similar to those reported for inventive example 2 except the shrinkage values were significantly higher even though the orientation ratio in the machine direction was only slightly higher (4.6:1) and in the transverse direction was actually less(3.5:1).

The above film samples were not irradiatively treated. However, they may also be usefully crosslinked by irradiation e.g. at a level of 2–6 megarads (Mrad) after biaxial stretching (which irradiative process is hereinafter referred to as post-irradiation), in the manner generally described in Lustig et al, U.S. Pat. No. 4,737,391 which is hereby incorporated by reference.

EXAMPLES 8–16

In Examples 10–16, biaxially stretched, heat shrinkable, coextruded, multilayer films of the present invention were made and their physical properties tested. Examples 8 and 9 are comparative examples not of the present invention.

Examples 8–16 are three layer films. One extruder was used for each layer. Each extruder was connected to an annular coextusion die from which heat plastified resins were coextruded forming a primary tube having a first inner layer, a second core layer and a third outer layer. The first and third layers being directly attached to opposing sides of the second core layer. The first/second/third layer thickness ratio was about 62:10:28.

In Examples 8–16, for each layer, the resin mixture was fed from a hopper into an attached single screw extruder where the mixture was heat plastified and extruded through a three layer coextrusion die into a primary tube. The extruder barrel temperatures for the second (core)layer was between about 248–285° F. (120–141 ° C.); for the first (inner)layer and for the third (outer) layer were about 300–320° F.(149–160° C.). The coextrusion die temperature profile was set from about 320° F. to 350° F. (160–177° C.). The extruded multilayer primary tube was cooled by spraying with cold tap water 50–68° F. (about 10–20° C.).

In Examples 8–16, a cooled primary tube of about 80 to 90 mm flatwidth was produced passing through a pair of nip rollers. The cooled flattened primary tube was inflated, reheated, biaxially stretched, and cooled again to produce a biaxially stretched and biaxially oriented film which was wound on a reel. The M.D. orientation ratio was about 4.5:1 to 4.8:1 and the T.D. orientation ratio was about 3.5:1 to 4.7:1 for all the films. The draw point or orientation temperature was below the predominant melting point for each layer oriented and above that layer's predominant glass transition point and is believed to be about 68–85° C. for Examples 8–16. The resultant biaxially oriented films of Examples 8–16 had an average gauge of 1.87 to 2.57 mil and had an excellent appearance.

Examples 8 and 9 are comparative examples of commercially successful multilayer oxygen barrier films suitable for packaging a variety of items including processed meat.

For Example 8, the heat sealing layer was the first layer of the multilayer film and the inner layer of the film tube. The first layer comprised a blend of: about 32.0 wt. % of a first polymer comprising a copolymer predominantly of ethylene with butene-1 monomer and having a reported density of about 0.888 g/cm$^3$, a melt index of 2.2 dg/min., a melting point of 70° C. which is available under the trademark Exact 4053 from Exxon Chemical Company of Houston Tex., U.S.A.; a second polymer comprising 23.0 wt. % of an ethylene-α-olefin copolymer of very low density polyethylene sold by Dow Chemical Company of Midland, Mich., U.S.A. under the trademark SL4100 which is a copolymer of ethylene and octene-1 reportedly having a melt index of about 1.0 dg/min and a density of about 0.912 g/cm$^3$, and a melting point of about 123° C.; and a third polymer comprising 34.0 wt. % of a copolymer of ethylene and vinyl acetate(EVA) available from Elf Atochem S.A. of Paris, France under the trademark Evatane 1002VN3 and having the following reported properties: 11% vinyl acetate content, 0.93–0.94 g/cm$^3$ density, 0.28 dg/min. melt index, and a melting point of about 96° C.; 4.0% of a stabilizer additive in an EVA carrier resin sold under the trademark Ampacet 500301 by Ampacet Corp. of Tarrytown, N.Y., U.S.A.; 4.0% by weight of a slip agent in a polyethylene carrier resin sold under the trademark Ampacet 10090, and 3.0% by weight of a processing aid which combined fluoroelastomer and erucamide in an ethylene α-olefin copolymer carrier resin sold under the trademark Ampacet 500906.

For Examples 8–16, each core layer comprised a 5.5:1 blend of vinylidene chloride-methylacrylate copolymer and vinylidene chloride-vinyl chloride copolymer.

For comparative Example 8, the third (outer) layer used polymers described above with It respect to the first layer. The third layer comprised a blend of: a first polymer of about 33.0 wt. % of Exact 4053; a second polymer comprising 25.0 wt. % of VLDPE (SL 4100); and a third polymer comprising 39.1 wt. % of EVA (Evatane 1002 VN3); 0.4% by weight of a slip agent (Ampacet 10090); and 2.5% by weight of a processing aid (Ampacet 500906).

Comparative Example 9 was similar to Comparative Example 8, except: that for the first polymer the Exact 4053 was replaced with a copolymer predominantly of ethylene with butene-1 monomer and having a reported density of about 0.885 g/cm$^3$, a melt index of 3.6 dg/min., a melting point of 71 ° C. which is available under the trademark Tafmer A-4085 from Mitsui Petrochemical Company of Tokyo, Japan; the second polymer was replaced with an ethylene copolymer predominantly of ethylene with octene-1 monomer and having a reported density of about 0.912 g/cm$^3$, a melt index of 1.0 dg/min., with a Vicat softening point of 95° C. and a melting point of about 122–123° C. which is available under the trademark Attane XU 61520.01 from Dow Chemical Company of Midland, Mich., U.S.A.; and the third polymer was replaced with LD 701.06. Also equivalent additives were used.

For Examples 10, 13, and 14, the heat sealing layer was the first layer of the multilayer film and the inner layer of the film tube. The first layer comprised an inventive blend of: about 32.0 wt. % of a first polymer comprising a copolymer predominantly of ethylene with octene-1 monomer and having a reported density of about 0.884 g/cm$^3$, a melt index of 1.3 dg/min., a melting point of 67–68° C. which is available under the trademark DexPlas 2M042 from Dex-Plastomers V.O.F. of Geleen, Netherlands; a second polymer comprising 23.0 wt. % of XU 61509.32; and a third polymer comprising 34.0 wt. % of Evatane 1002 VN3; 4.0% of a stabilizer additive Ampacet 500301; 4.0% by weight of a slip agent Ampacet 10090, and 3.0% by weight of a processing aid Ampacet 500906.

For Examples 10, 13, and 14, the third (outer) layer used polymers described above with respect to the first layer. The third layer comprised an inventive blend of: a first polymer of about 33.0 wt. % of DexPlas 2M042; a second polymer comprising 25.0 wt. % of Attane XU 61509.32; and a third polymer comprising 39.1 wt. % of EVA Evatane 1002 VN3; 0.4% by weight of a slip agent (Ampacet 10090); and 2.5% by weight of a processing aid (Ampacet 500906).

For Examples 11, 12, 15, and 16 of the invention, the composition was as described for Examples 10, 13, and 14 except in the inner and outer layers each respective first polymer was replaced with VP8770.

The flat widths (½ the circumference of the biaxially stretched film) of the tubular film were a nominal 300 mm for the biaxially stretched films of Examples 8 to 12, and were 350 mm for the films of Examples 13–16.

The multilayer films of Examples 8 to 13 and 15 were irradiated after orientation by electron beam according to methods well known in the art. The films of Examples 8, 11, 13, and 15 were irradiated to a level of 4.8 Mrad. The film of Example 9 was irradiated to a level of 3.8 Mrad. The films of Examples 10 and 12 were irradiated to a level of 4.0 Mrad. The films of Examples 14 and 16 were not irradiated.

Physical properties of the multilayer films were tested and are reported in Tables 2 and 3.

TABLE 2

| Ex. No. | AVG. GAUGE mil ($\mu$) | TENSILE STRENGTH at RT ×10$^3$ psi (MPa) MD/TD | RAM PUNCTURE Force Newton | RAM PUNCTURE Stress MPa | RAM PUNCTURE Total Energy Joule | SHRINK at 90° C. % MD/TD | SHRINK at 80° C. % MD/TD | HAZE % | GLOSS at 45° Angle | TEAR STRENGTH g/mil (g/$\mu$) MD/TD |
|---|---|---|---|---|---|---|---|---|---|---|
| 8 | 2.38 (60) | 10.9/9.9 (75/68) | 51 | 176 | 0.44 | 50/51 | ND | 7.1 | 78 | 32/59 (1.3/2.3) |
| 9 | 2.30 (58) | 11.5/11.3 (79/78) | 60 | 213 | 0.37 | 46/50 | ND | 9.0 | 73 | 29/36 (1.1/1.4) |

TABLE 2-continued

| Ex. No. | AVG. GAUGE mil ($\mu$) | TENSILE STRENGTH at RT ×10³ psi (MPa) MD/TD | RAM PUNCTURE Force Newton | RAM PUNCTURE Stress MPa | RAM PUNCTURE Total Energy Joule | SHRINK at 90° C. % MD/TD | SHRINK at 80° C. % MD/TD | HAZE % | GLOSS at 45° Angle | TEAR STRENGTH g/mil (g/$\mu$) MD/TD |
|---|---|---|---|---|---|---|---|---|---|---|
| 10 | 2.11 (54) | 11.2/11.8 (77/81) | 66 | 198 | 0.57 | 52/53 | ND | 8.2 | 77 | 35/58 (1.4/2.3) |
| 11 | 2.21 (56) | 11.2/12.6 (77/87) | 84 | 242 | 0.78 | 51/53 | ND | 9.3 | 77 | 50/61 (2.0/2.4) |
| 12 | 2.57 (65) | 12.4/13.6 (86/93) | 99 | 265 | 1.07 | 54/55 | ND | 11.1 | 76 | 63/87 (2.5/3.4) |
| 13 | 1.87 (47) | 12.4/13.5 (85/93) | 77 | 273 | 0.74 | 54/55 | 37/42 | 8.4 | 78 | 38/52 (1.5/2.0) |
| 14 | 2.12 (54) | ND | 72 | 244 | 0.68 | 54/57 | ND | 4.6 | 78 | ND |
| 15 | 2.17 (55) | 12.6/14.7 (87/101) | 95 | 278 | 0.94 | 51/54 | 32/39 | 8.5 | 75 | 64/60 (2.5/2.4) |
| 16 | 2.32 (59) | ND | 93 | 280 | 0.90 | 52/56 | ND | 4.6 | 78 | ND |

RT = Room Temperature (~20–23° C.)
ND = Not Determined

TABLE 3

| Ex. No. | IMPULSE SEAL RANGE min./max. volts | ELONGATION AT BREAK at RT % MD/TD | 1% SECANT MODULUS at RT MPa MD/TD | SHRINK FORCE AT 90° C. g/mil (g/$\mu$) MD/TD | SHRINK FORCE AT RT g/mil (g/$\mu$) MD/TD | IRRADIATION Mrad |
|---|---|---|---|---|---|---|
| 8 | ND | 237/311 | 227/267 | 124/75 (4.9/3.0) | 74/55 (2.9/2.2) | 4.8 |
| 9 | ND | 237/295 | 225/220 | 147/113 (5.8/4.4) | 42/38 (1.7/1.5) | 3.8 |
| 10 | 27–47 | 224/335 | 246/275 | 143/84 (5.6/3.3) | 72/61 (2.8/2.4) | 4.0 |
| 11 | ND | 181/274 | 246/229 | 139/120 (5.3/4.7) | 61/90 (2.4/3.5) | 4.8 |
| 12 | 28–47 | 205/266 | 234/289 | 134/105 (5.3/4.1) | 64/75 (2.5/3.0) | 4.0 |
| 13 | 27–49 | 215/239 | 256/272 | ND | ND | 4.8 |
| 14 | ND | ND | ND | ND | ND | 0 |
| 15 | ND | 206/232 | 242/265 | ND | ND | 4.8 |
| 16 | ND | ND | ND | ND | ND | 0 |

RT = Room Temperature (~20–23° C.)
ND = Not Determined

Referring now to Tables 2 and 3, Comparative Examples 8 and 9 present physical property values which are acceptable for food packaging films which are commercially useful for packaging processed meats. Examples 10–16 all have comparable or better values for shrinkage properties, gloss, and tensile properties. The puncture resistance properties were clearly superior for the inventive films. This is notable because the increase in puncture resistance properties comes without loss in shrinkage properties. The puncture resistance properties of the inventive films are from 11% to 80% higher for the measured maximum ram puncture force, and from 30% to 132% higher for the measured total energy absorbed by the film relative to the films of Comparative Examples 8 and 9. The shrinkage values for the inventive films range from being comparable to the comparative film of Example 8 to being from 8 to 11% higher for values measured at 90° C. The films also had very good shrinkage values at lower temperatures i.e. 80° C., see e.g. the films of Examples 13 and 15. The inventive multilayer films demonstrate excellent tensile strengths, and 1% secant modulus values. The optical properties were also quite good; the haze and gloss values reflect measurements made on films that have been coated with an antiblock starch powder. The elongation at break is good.

Films of the invention processed well and had desirable sealing properties. The impulse seal range test demonstrates a commercially acceptable and advantageously broad sealing range.

The above tests demonstrate multilayer films having a very good heat sealing layer can be made to produce high shrink films having superior puncture resistance properties and other commercially desirable physical properties. The inventive films have strong seals and have a desirable combination of high shrinkability at low temperatures e.g. 80 or 90° C., high puncture resistance and good optical properties. Use of a lower melt index second polymer in the inventive blend of the film improves bubble stability during orientation and also contributes positively to higher shrinkage and improved puncture resistance. Use of the higher melting point, lower melt index (higher molecular weight) ethylene octene-1 copolymer as the first polymer of the blend in Examples 11, 12, 15, and 16 produces films having greatly superior puncture properties. Use of a ethylene octene-1 copolymer having a lower melting point(but still higher than that of the ethylene butene-1 first polymer of the comparatives Examples 8 and 9), and having a lower melt index(higher molecular weight) as the first polymer in Examples 10, 13, and 14 results in improved properties including puncture properties relative to the comparative films of Examples 8 and 9. Also, relative to the Examples 11, 12, 15, and 16 these films have moderate tear propagation strengths and are less susceptible to degradation of optical properties by irradiation. The core layer of all the films of Examples 8–16 provided oxygen and moisture barrier properties.

EXAMPLES 17–25

In Examples 17–25, biaxially stretched, heat shrinkable 3-layer coextruded films of the invention were made as described above for the films of Examples 8–16 except as noted below. Examples 17–25 are suitable for packaging items such as fresh red meat or processed meat.

For Examples 17–25, each second (core) layer comprised a 5.5:1 blend of vinylidene chloride-methylacrylate copolymer and vinylidene chloride-vinyl chloride copolymer.

The first (inner) and third (outer) layer formulations were as follows.

For Example 17, the inner layer of the film comprised a blend of: 33% by weight of a first polymer of Affinity PF 1140; 23% by weight of a second polymer which was an ethylene copolymer predominantly of ethylene with octene-1 monomer and having a reported density of about 0.912 g/cm$^3$, a melt index of 1.0 dg/min., with a Vicat softening point of 95° C. and a melting point of about 122–123° C. which is available under the trademark Attane XU 61520.01 from Dow Chemical Company of Midland, Mich., U.S.A.; 36% by weight of a third polymer of EVA (Escorene LD 701.06); 4.0% of a stabilizer additive (Ampacet 500301); and 4.0% by weight of a processing aid (Ampacet 100594) which combines a fluoroelastomer processing aid with an oleamide slip additive in an ethylene at-olefin copolymer carrier resin.

For Example 17, the third (outer) layer used polymers described above with respect to the first layer. The third layer comprised an inventive blend of: a first polymer of about 33.0 wt. % of Affinity PF 1140; a second polymer comprising 25.0 wt. % of VLDPE Attane XU 61520.01; and a third polymer comprising 40.0 wt. % of EVA (Escorene LD 701.06); and 2.0% Ampacet 100510 which combines a fluoroelastomer processing aid with an oleamide slip additive in an ethylene a-olefin copolymer carrier resin.

The process conditions were as described above for the multilayer films of Examples 8–16 except as described below. The first/second/third thickness layer ratio was about 62:9:29.

Regarding the inventive films of Examples 18–25, the layer ratio was the same as for Example 17 and the process conditions were similar and formulations were the same except as follows.

For Examples 18 and 19 the first polymer of the inner and outer layers of Example 17 was replaced with DexPlas 2M042 which is further described above. The amount of first polymer used in the inner layer was changed to 35% by weight; the outer layer amount remained at 33%. The second and third polymers remained the same as for Example 17. In the inner layer the Ampacet 500301 stabilizer was replaced with 2% of a similar stabilizer available from Techmer PM under the trademark Techmer 11381E118 and the Ampacet 100594 processing aid was replaced with 4% of a similar processing aid (but having an erucimide slip agent) available from Techmer PM under the trademark Techmer 11416E118. In the outer layer the Ampacet 100510 processing aid was replaced with 2% of a similar processing aid (but using an erucimide slip agent) which is available from Techmer PM under the trademark Techmer 11378E118.

Example 20 had the same film formulation as Examples 18 and 19 except that the second polymer of the inner and outer layers was replaced with Attane XU61509.32.

Example 21 had the same film formulation as for Example 20 except the amounts of the first second, and third polymers of the inner and outer layers were changed. The inner layer of the film of example 21 used 45%/19%/30% of the respective first/second/third polymers. The outer layer used 45%/20%/33%, respectively.

Examples 22 and 23 had the same film formulation as for Example 20 except that the first polymer of the inner and outer layers was replaced with Affinity VP 8770.

Examples 24 and 25 both used an inner layer blend formulation of 32% of a first polymer of Affinity VP 8770; 23% of a second polymer of SL4100; 34% of a third polymer of Evatane 1002 VN3; 4% by weight of a slip agent (Ampacet 10090); 3% by weight of a processing aid which combined fluoroelastomer and erucamide in an ethylene α-olefin copolymer carrier resin sold under the trademark Ampacet 10919, and 4% of AN 400 which is an antioxidant in an EVA carrier resin available from A. Schulman Inc. Ltd. of Wales, Great Britain. The outer layer blend formulation of the films of Examples 24 and 25 was the same as the inner layer except that the amounts of the first, second and third polymers were adjusted to 33%, 25%, and 39.1% respectively and the additives were replaced with 0.4% Ampacet 10090(slip agent) and 2.5% Ampacet 10919 (processing aid).

The films were all irradiated by an electron beam curing unit to varying levels to promote crosslinking. The biaxially stretched films of Examples 17–25 were irradiated after orientation by electron beam according to methods well known in the art to levels indicated in Table 5 below.

In Example 17, a flattened biaxially stretched film tube of about 26 inches circumference was produced. In Examples 18–25, a flattened biaxially stretched film tube of about 30¼ inches circumference was produced. The M.D. orientation ratio was about 4.9:1 and the T.D. ratio was about 4.3:1 to 4.4:1 for all films. except the T.D. ratio for the film of Example 17 was about 4.1:1.

Physical properties of the multilayer films (irradiated films for Examples 17–23 and 25) were tested and are reported in Tables 4 and 5.

TABLE 4

| Ex. No. | AVG. GAUGE mil (μ) | TENSILE STRENGTH at RT ×10³ psi (MPa) MD/TD | RAM PUNCTURE Force Newton | RAM PUNCTURE Stress MPa | RAM PUNCTURE Total Energy Joules | SHRINK at 90° C. % MD/TD | SHRINK at 80° C. % MD/TD | HAZE % | GLOSS at 45° Angle | TEAR STRENGTH g/mil (g/μ) MD/TD |
|---|---|---|---|---|---|---|---|---|---|---|
| 17 | 2.33 (59) | 11.9/12.2 (82/84) | 76 | 276 | 0.63 | 43/49 | 23/34 | 9.3 | 78 | 47/64 (1.9/2.5) |
| 18 | 2.36 (60) | 9.3/12.3 (64/85) | 82 | 257 | 0.71 | 51/53 | 32/40 | 7.3 | 75 | 27/48 (1.1/1.9) |
| 19 | 2.61 (66) | ND | 79 | 254 | 0.66 | 50/53 | 32/40 | 6.1 | 74 | 35/56 (1.4/2.2) |
| 20 | 2.44 (62) | 11.2/13.1 (77/90) | 94 | 274 | 0.82 | 51/53 | 33/40 | 7.1 | 72 | 40/61 (1.6/2.4) |
| 21 | 2.61 (66) | 11.0/12.5 (76/86) | 95 | 243 | 0.97 | 53/56 | 37/42 | 7.8 | 74 | 38/45 (1.5/1.8) |
| 22 | 2.37 (60) | 11.1/14.6 (77/101) | 107 | 309 | 0.99 | 51/54 | 32/39 | 6.7 | 76 | 37/48 (1.5/1.9) |
| 23 | 2.66 (68) | ND | 114 | 295 | 1.07 | 51/54 | 32/39 | 5.7 | 77 | 39/45 (1.5/1.8) |
| 24 | 2.05 (52) | ND | 65 | 169 | 0.51 | 50/51 | 27/35 | 5.4 | 78 | 17/57 (0.67/2.2) |
| 25 | 1.98 (50) | 13.3/10.8 (92/74) | 63 | 163 | 0.52 | 47/48 | 25/34 | 6.3 | 73 | ND |

ND = Not Determined
RT = Room Temperature (~20–23° C.)

TABLE 5

| Ex. No. | IMPULSE SEAL RANGE min./max. volt | IRRADIATION Mrad | ELONGATION AT BREAK at RT % MD/TD | 1% SECANT MODULUS MPa MD/TD | SHRINK FORCE AT 90° C. g/mil (g/μ) MD/TD | SHRINK FORCE AT RT g/mil (g/μ) MD/TD |
|---|---|---|---|---|---|---|
| 17 | 31–46 | 3.75 | 213/240 | 177/163 (5.2/5.0) | 133/127 (2.5/3.7) | 64/93 |
| 18 | 27–48 | 3.75 | 155/270 | 201/180 (5.0/4.0) | 127/101 (0.8/1.5) | 21/39 |
| 19 | 27–45 | 4.25 | ND | ND (5.6/4.7) | 142/120 (1.1/1.1) | 29/29 |
| 20 | 28–42 | 3.75 | 185/257 | 187/200 (5.3/4.6) | 135/116 (0.7/1.2) | 19/30 |
| 21 | 27–40 | 3.75 | 204/274 | 182/171 (5.0/4.5) | 128/114 (1.0/1.5) | 25/37 |
| 22 | 27–38 | 3.75 | 178/262 | 181/221 (5.9/5.4) | 151/138 (1.5/1.5) | 38/38 |
| 23 | 28–50+ | 4.25 | ND | ND (5.8/5.2) | 148/132 (1.1/1.4) | 28/36 |
| 24 | ND | 0 | ND | ND | ND | ND |
| 25 | 19–22 | 3.95 | 156/276 | 192/201 | ND | ND |

RT = Room Temperature (~20–23° C.)
ND = Not Determined

Referring now to Tables 4 and 5, the films of Examples 17–25 all present physical property values which are acceptable for plastic films which are commercially useful for packaging articles e.g. fresh or processed meats. All of the inventive films had excellent shrinkage values at low temperatures e.g. 80° C. or 90° C.

Comparison of the film of Example 17 with that of Example 18 shows that substitution of a ethylene octene-1 copolymer having a lower melting point and density as the first polymer in the inventive blend used in the first and third layers permits production of biaxially stretched films having higher shrinkage values, improved puncture resistance and lower tear strength values. Although a lower, but suitable, shrink force was obtained, advantageously so too was a broader sealing range.

The films of Examples 18 and 19 were identical to each other except for irradiation levels. Little variation was seen in physical properties between the film of Example 18 which was irradiated to a level of 3.75 Mrad and the film of Example 19 which was irradiated to a level of 4.25 Mrad. The lower stress and puncture values for Example 19 are believed due to gauge variation.

The film of Example 20 is similar to that Example 18, except that the second polymer of the inventive blend was replaced with a ethylene octene-1 copolymer having a lower melt index (higher molecular weight). It is seen that the films produced in Example 20 have a higher maximum puncture force, higher stress, and higher total energy absorbed without negatively impacting on shrinkage values or optical properties. Higher, but acceptable tear propagation strengths were also measured as was a narrower sealing range.

The formulation of the film of Example 21 was similar to that for Example 20 except that the amount of the first polymer was increased while the amounts of the second and third polymers were decreased. The increased relative proportion of the ethylene octene-1 polymer having a melting point of from 55 to 95° C. resulted in softer, more ductile biaxially stretched films having a higher total energy absorption, lower tear propagation strength, higher shrink and a narrower sealing range.

The film of Example 22 was similar to that of Example 20, except that the first polymer of the inventive blend of the first and third layers was replaced with an ethylene octene-1 copolymer of the same reported density but having a higher melting point and lower melt index(higher molecular weight). Much better puncture resistance values were measured for the film of Example 22, and also better optical properties, and beneficially lower tear strengths. The films of example 22 had a narrower sealing range. These inventive films had higher shrink forces which may beneficially result in tighter packages.

The film of Example 23 was similar to that of Example 22, but was irradiated to higher dosage level (4.25 Mrad compared to 3.75 Mrad for Example 22). The physical properties measured were generally comparable with the broader sealing range likely due to increased crosslinking from the higher irradiation level, and the slightly higher puncture resistance values probably due to gauge variation.

The films of Examples 24 and 25 were made on a different orientation line and are believed to have been processed at higher orientation temperature conditions relative to the films of Examples 17–23. It may be seen that higher orientation temperatures tend to result in lower shrinkage values and puncture resistance for the inventive film formulations. The unirradiated film of Example 24 generally has lower shrinkage values and better optical properties. It is to be expected that irradiation will broaden the sealing range of the inventive films and the impulse range for the film of Example 25 is viewed as an anomaly.

The films of the present invention have desirable sealing properties. The impulse seal range test demonstrates a commercially acceptable and advantageously broad sealing range. 1 and 2 volt differences in sealing range values are significant and the 2 volt extension on either end of the range is believed to translate into broader ranges for many commercially available sealers other than the Sentinel.

Unless otherwise indicated the haze and gloss values reflect measurements made on films that have been coated with an antiblock powder of starch.

Examples 8–25 are three layered films. However, multilayered films of two or four or more layers are contemplated by the present invention. The inventive multilayer films may include tie or adhesive layers as well as layers to add or modify various properties of the desired film such as heat sealability, toughness, abrasion resistance, tear resistance, puncture resistance, optical properties, gas or water barrier properties, shrinkability, and printability. These layers may be formed by any suitable method including coextrusion, extrusion coating, and lamination.

Biaxially stretched, heat shrinkable 5-layer coextruded films may also be made using similar equipment as for the above examples except that additional extruders and a five layer coextrusion die may be used. Various dies known in the art may be used including e.g. spiral dies. Films may be made under similar conditions and e.g. as noted below. The resins may be heat plastified by extruders and extruded through the die into a primary tube having five concentric sequential layers(1,2,3,4,5) with the first layer being the inside surface layer of the tube and the fifth layer being the exterior surface layer of the tube. The first/second/third/fourth/fifth layer ratio may be e.g. 10/50/7/10/23.

EXAMPLES 26–79

Examples 26–79 are additional illustrative embodiments contemplated by the present invention. The structures of these examples are listed in Tables 10–13. These structures made be moldings, sheets, tubes, or films. Inventive films having the indicated structures may be made by processes similar to those disclosed above including, without limitation, blown bubble, double bubble or trapped bubble, tenter frame, co-extrusion, and coating lamination processes (all of which processes are suitable for producing all the films of the present invention including unoriented, uni- or bi-axially oriented, heat shrinkable or non-heat shrinkable films. Structures of the present invention may be crosslinked or not. e.g. by irradiation at level of 2–5 Mrad or higher either before or after any stretching or shaping or orientation process. All of the inventive films of these or any of the above disclosed embodiments may be used for packaging materials, as overwraps or formed into bags. These films or bags may be closed by clipping, but also have excellent heat sealing properties.

In Examples 26–37 and 57, inventive blends are shown as the first layer of a multilayer structure, e.g. film, of at least 5 layers, whereas in Examples 38–56 inventive blends are shown as an interior layer of a multilayer structure of at least 5 layers, however it is to be appreciated that the blend is inventive in its own right and may comprise the structure of monolayer or multilayer structures of 2 or more layers as either or both of one or more sure or interior layers. Also, in Examples 58–79 monolayer structures are shown, but it is to be appreciated that these disclosed structures may form one or more layers of a multilayer structure e.g. heat shrinkable film. Referring to Tables 6–9 various structures are shown of the invention.

TABLE 6

| Ex. # | First Layer | Second Layer | Third Layer | Fourth Layer | Fifth Layer |
|---|---|---|---|---|---|
| 26 | 28% A + 30% D + 20% B + 20% C + 2% E | 75% D + 25% C | O₂ Barrier Layer e.g. EVOH or pvdc | 75% D + 25% C | 80% D + 18% B + 2% E |
| 27 | 28% A + 30% D + 20% B + 20% C + 2% E | 75% D + 25% C | O₂ Barrier Layer e.g. EVOH or pvdc | 75% D + 25% C | 98% F + 2% E |
| 28 | 28% A + 30% D + 20% B + 20% C + 2% E | 75% D + 25% C | O₂ Barrier Layer e.g. EVOH or pvdc | 75% D + 25% C | 28% A + 30% D + 20% B + 20% C + 2% E |
| 29 | 28% A + 30% D + 20% B + 20% C + 2% E | 30% A + 50% D + 20% C | O₂ Barrier Layer e.g. EVOH or pvdc | 30% A + 50% D + 20% C | 28% A + 50% D + 20% C + 2% E |

TABLE 6-continued

| Ex. # | First Layer | Second Layer | Third Layer | Fourth Layer | Fifth Layer |
|---|---|---|---|---|---|
| 30 | 28% A + 20% C + 30% D + 20% F + 2% E | 25% C + 75% G | O$_2$ Barrier Layer e.g. EVOH or pvdc | 25% C + 75% G | 80% D + 18% F + 2% E |
| 31 | 28% A + 50% D + 20% F + 2% E | 20% B + 25% C + 55% G | O$_2$ Barrier Layer e.g. EVOH or pvdc | 25% C + 75% G | 98% F + 2% E |
| 32 | 28% A + 20% C + 30% D + 20% B + 2% E | 75% D + 25% C | O$_2$ Barrier Layer e.g. EVOH or pvdc | 75% D + 25% C | 28% A + 50% D + 20% B + 2% E |
| 33 | 28% A + 20% C + 30% D + 20% B + 2% E | 30% A + 50% D + 20% C | O$_2$ Barrier Layer e.g. EVOH or pvdc | 30% A + 50% D + 20% C | 28% A + 50% D + 20% C + 2% E |
| 34 | 28% D + 30% A + 20% B + 20% C + 2% E | 75% A + 25% C | O$_2$ Barrier Layer e.g. EVOH or pvdc | 75% A + 25% C | 80% D + 18% B + 2% E |
| 35 | 28% D + 30% A + 20% B + 20% C + 2% E | 75% A + 25% C | O$_2$ Barrier Layer e.g. EVOH or pvdc | 75% A + 25% C | 98% F + 2% E |

TABLE 7

| Ex. # | First Layer | Second Layer | Third Layer | Fourth Layer | Fifth Layer |
|---|---|---|---|---|---|
| 36 | 28% D + 30% A + 20% B + 20% C + 2% E | 75% A + 25% C | O$_2$ Barrier Layer e.g. EVOH or pvdc | 75% A + 25% C | 28% A + 30% D + 20% B + 20% C + 2% E |
| 37 | 28% A + 30% D + 20% B + 20% C + 2% E | 30% D + 50% A 20% C | O$_2$ Barrier Layer e.g. EVOH or pvdc | 30% D + 50% A + 20% C | 28% A + 50% D + 20% C + 2% E |
| 38 | 28% D + 50% A + 20% F + 2% E | 20% B + 25% C + 55% G | O$_2$ Barrier Layer e.g. EVOH or pvdc | 25% C + 75% G | 80% D + 18% F + 2% E |
| 39 | 28% D + 50% A + 20% F + 2% E | 30% B + 25% C + 55% G | O$_2$ Barrier Layer e.g. EVOH or pvdc | 25% C + 75% G | 98% F + 2% E |
| 40 | 28% D + 50% A + 20% B + 2% E | 20% B + 55% D + 25% C | O$_2$ Barrier Layer e.g. EVOH or pvdc | 75% D + 25% C | 28% D + 50% A + 20% B + 2% E |
| 41 | 28% D + 50% A + 20% B + 2% E | 20% A + 20% B + 30% D + 20% C | O$_2$ Barrier Layer e.g. EVOH or pvdc | 30% A + 50% D + 20% C | 28% D + 50% A + 20% C + 2% E |
| 42 | 40% A + 58% F + 2% E | 50% A + 25% C + 25% F | O$_2$ Barrier Layer e.g. EVOH or pvdc | 50% A + 25% C + 25% F | 40% A + 58% F + 2% E |
| 43 | 40% A + 58% H + 2% E | 50% A + 25% C + 25% H | O$_2$ Barrier Layer e.g. EVOH or pvdc | 75% A + 25% C + 25% H | 98% A + 2% E |
| 44 | 40% A + 58% I + 2% E | 50% A + 25% C + 25% I | O$_2$ Barrier Layer e.g. EVOH or pvdc | 50% A + 25% C + 25% I | 40% A + 58% I + 2% E |
| 45 | 40% D + 58% F + 2% E | 25% A + 25% D + 30% F + 20% C | O$_2$ Barrier Layer e.g. EVOH or pvdc | 30% D + 50% F + 20% C | 40% D + 58% F + 2% E |

TABLE 8

| Ex. # | First Layer | Second Layer | Third Layer | Fourth Layer | Fifth Layer |
|---|---|---|---|---|---|
| 46 | 40% D + 58% G + 2% E | 25% C + 75% G | O$_2$ Barrier Layer e.g. EVOH or pvdc | 25% C + 75% G | 40% D + 58% G + 2% E |
| 47 | 40% D + 58% I + 2% E | 25% C + 75% I | O$_2$ Barrier Layer e.g. EVOH or pvdc | 25% C + 75% I | 98% I + 2% E |
| 48 | 98% F + 2% E | 25% A + 20% B + 30% D + 25% C | O$_2$ Barrier Layer e.g. EVOH or pvdc | 75% D + 25% C | 98% F + 2% E |
| 49 | 98% G + 2% E | 30% A + 20% B + 30% D + 20% C | O$_2$ Barrier Layer e.g. EVOH or pvdc | 30% A + 50% D + 20% C | 98% G + 2% E |
| 50 | 98% H + 2% E | 25% B + 50% G + 25% C | O$_2$ Barrier Layer e.g. EVOH or pvdc | 75% G + 25% C | 98% H + 2% E |
| 51 | 98% F + 2% E | 25% B + 50% G + 25% C | O$_2$ Barrier Layer e.g. EVOH or pvdc | 75% G + 25% C | 98% F + 2% E |
| 52 | 98% F + 2% E | 25% B + 50% G + 25% C | O$_2$ Barrier Layer e.g. EVOH or pvdc | 75% G + 25% C | 98% F + 2% E |
| 53 | 98% I + 2% E | 75% I + 25% C | O$_2$ Barrier Layer e.g. EVOH or pvdc | 75% I + 25% C | 98% I + 2% E |
| 54 | 98% F + 2% E | 25% A + 25% C + 50% F | O$_2$ Barrier Layer e.g. EVOH or pvdc | 25% C + 75% F | 98% F + 2% E |
| 55 | 98% H + 2% E | 25% C + 75% H | O$_2$ Barrier Layer e.g. EVOH or pvdc | 25% C + 75% H | 98% H + 2% E |
| 56 | 98% G + 2% E | 25% B + 50% G + 25% C | O$_2$ Barrier Layer e.g. EVOH or pvdc | 75% G + 25% C | 98% G + 2% E |
| 57 | 20% C + 78% I + 2% E | 75% A + 25% C | O$_2$ Barrier Layer e.g. EVOH or pvdc | 75% A + 25% C | 98% I + 2% E |

TABLE 9

| Example # | Layer Composition |
|---|---|
| 58 | 58% G + 20% B + 20% C + 2% E |
| 59 | 53% H + 25% D + 20% C + 2% E |
| 60 | 28% A + 50% F + 20% C + 2% E |
| 61 | 78% I + 20% C + 2% E |
| 62 | 50% I + 30% D + 18% C + 2% E |
| 63 | 20% C + 78% I + 2% E |
| 64 | 25% A + 20% B + 53% F + 2% E |
| 65 | 20% C + 78% H + 2% E |
| 66 | 25% A + 20% C + 53% G + 2% E |
| 67 | 40% F + 40% A + 20% C |
| 68 | 25% A + 20% C + 30% F + 35% D |
| 69 | 35% G + 25% A + 20% B |
| 70 | 40% G + 20% B + 20% C + 20% D |
| 71 | 40% H + 40% A + 20% C |
| 72 | 40% H + 40% D + 20% C |
| 73 | 46% I + 40% A + 20% C |
| 74 | 50% I + 30% D + 20% C |
| 75 | 75% I + 25% C |
| 76 | 75% H + 25% C |
| 77 | 50% G + 25% B + 25% C |
| 78 | 55% F + 25% A + 20% C |
| 79 | 50% H + 30% G + 20% C |

Referring to Tables 6 and 7, Component A comprises a first polymer having a melting point of from 55 to 95° C. comprising a copolymer of predominantly ethylene and at least one α-olefin comprising octene-1. Component B comprises a second polymer having a melting point of from 115 to 128° C. comprising a copolymer of ethylene and at least one α-olefin. Component C comprises a third polymer having a melting point of from 60 to 110° C. comprising a copolymer of ethylene and a vinyl ester (e.g. EVA), an acrylic acid, a methacrylic acid, or an alkyl acrylate. Component D comprises a copolymer of predominantly ethylene and at least one α-olefin (preferably octene-1) having a melting point of from 91 to 110° C., and preferably having a $\overline{M}_w/\overline{M}_n$<3.5. Component E comprises a processing aid. Component F comprises an interpolymer having at least two melting points, one of which is of from about 91 to 110° C., and another of which is of from about 115 to 128° C. Component G comprises an interpolymer having at least two melting points, one of which is of from about 55 to 95° C. and relates to a component being a copolymer of ethylene and octene-1, and another of which is of from about 91 to 110° C. and relating to a component being a copolymer of ethylene and at least one α-olefin (preferably octene-1). Component H comprises an interpolymer having at least two melting points, one of which is of from about 55 to 95 ° C. and relates to a component being a copolymer of ethylene and octene-1, and another of which is of from about 115 to 128° C. and relating to a component being a copolymer of ethylene and at least one α-olefin (preferably octene-1). Component I comprises an interpolymer having at least three melting points, the first of which is of from about 55 to 95° C. and relates to a component being a copolymer of ethylene and octene-1, the second of which is of from about 91 to 110° C. and relating to a component being a copolymer of ethylene and at least one α-olefin (preferably octene-1), and the third of which is of from about 115 to 128° C. and relating to a component being a copolymer of ethylene and at least one α-olefin (preferably octene-1) each of the three melting point peaks being at least 5° C. apart from one another.

Referring to the embodiments of the invention disclosed in Tables 6–9 and also the above embodiments disclosed in all the Examples, the present invention contemplates the use of blends of the first, second, and/or third polymer components which are made in situ by the polymer resin manufacturer as, for example, interpolymers. Thus, the claimed and disclosed blends may be of separate resins, e.g. in pellet or powder form, which are combined by dry, wet or melt mixing post-polymer manufacture, e.g. by a converter or film manufacturer, or alternatively one or more of the polymer components may be formed with an additional polymer by the resin manufacturer using a process involving monomer streams or components feeding a sequential or simultaneous catalyst system. Interpolymerized products (i.e. interpolymers) are contemplated by the present invention and included within the definition thereof. An interpolymer as that term is used herein means a polymer product which comprises at least two polymers e.g. copolymers of ethylene which is polymerized in either a single reactor or separate multiple reactors operated in parallel or series, as e.g. further disclosed in Parikh et al, PCT Application No. U.S. 92/11269(Publication No. WO 93/13143) entitled "Ethylene Interpolymer Polymerizations" filed Dec. 29, 1992 claiming a U.S. priority Ser. No. 07/815,716, filed Dec. 30, 1991, which application and disclosure is hereby incorporated by reference in its entirety.

In another aspect of the invention, one or more alternative layers having gas barrier properties may be incorporated into a multilayer film as either an intermediate or surface layer or both. For example, ethylene vinyl alcohol copolymer (EVOH), vinylidehe chloride-methylacrylate copolymer, nylon such as nylon 6 or amorphous nylon, polyvinylidene chloride-vinyl chloride copolymer (pvdc), acrylonitriles and other materials having oxygen barrier properties may be used in one or more layers such as the core layer. Blends of resins having gas barrier properties may also be used e.g. a blend of nylon with EVOH. Typical gas barrier films will have an $O_2$ transmission of less than 15 cc/100 in$^2$ for 24 hrs. at 1 atm. In various multilayer embodiments of the invention well known adhesive resins such as maleic anhydride modified EVAs or polyethylenes, or acrylic acid or methacrylic acid copolymers e.g. with ethylene may be used in addition to or in place of various polymers indicated above in intermediate or outer layers to adhere to adjacent layers. Use of such adhesives may be advantageous e.g. when layers containing polymers such as EVOH are to be bonded to ethylene polymer containing layers such as VLDPE.

For preferred 5 layer film embodiments of the invention, the total film thickness is typically such that the first layer will typically comprise 10–50%, the second layer will comprise 10–50%, the third layer will comprise about 5–10%, the fourth layer will comprise 10–25%, and the fifth layer will comprise 10–25% of the total film thickness.

Puncture resistance of the formulations and compositions of the present invention when made into oriented films may be dramatically affected by adjustment of the draw point temperature. The inventive films may be made with surprising and unexpectedly high puncture resistance properties including very high total energy absorption E and maximum puncture force P by carefully controlling the draw point temperature. The unique formulations of the present invention result in dramatic property improvements. The shrinkage values, shrink force, and puncture resistance properties are all strongly affected by draw point temperature. If the film is oriented at too high a temperature these properties will be unnecessarily low and not take fill advantages of the invention for some uses. The best draw point temperature may be experimentally determined without undue experimentation by those skilled in the art and may depend upon the exact formulation selected, number of layers, thicknesses, orientation speeds, etc.

Figure 4:
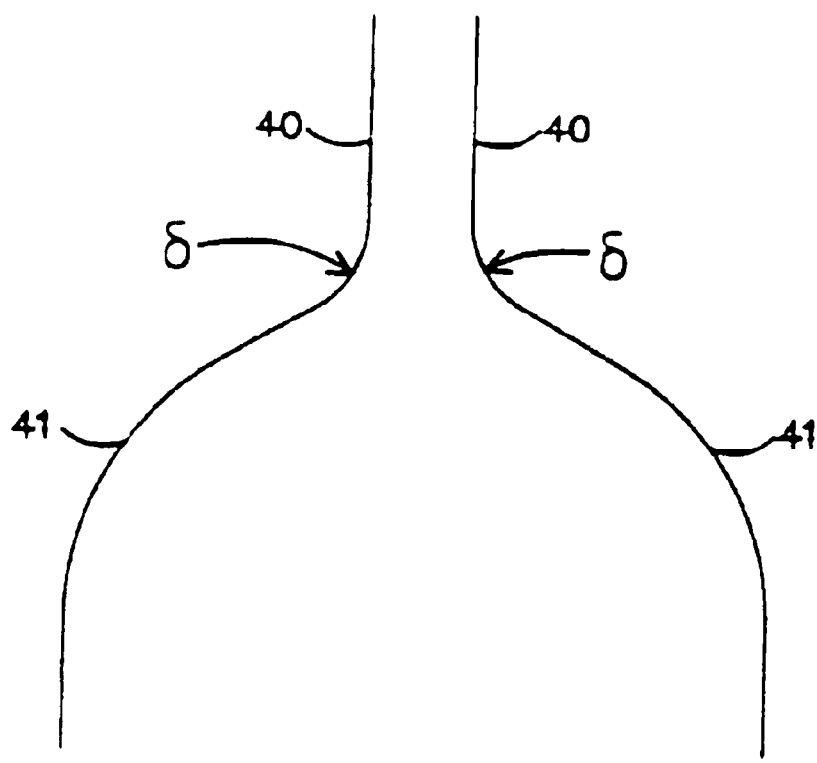
FIG. 4 is a schematic view of film tube expansion.

The puncture resistance values demonstrated by the present invention are greatly superior to many prior art films. The draw point temperature may be measured by an infrared pyrometer which is directed as close to the actual bubble expansion draw point as possible. The draw point is the point location on the primary tube that begins to stretch greatly as it transitions to a secondary bubble. Referring to FIG. 4 of the drawings a schematic view of a primary tube 40 is presented with the draw point indicated by arrows δ resulting in an expanded oriented film 41. Good films of the present invention may be made at orientation(draw point) temperatures of 183° F. and the like, but the present inventive films permit the manufacture of extraordinary films having dramatically improved puncture properties by utilizing lower draw point temperatures, especially draw point temperatures in the range of 150 to 190° F. (65–88 ° C.), and preferably of from 65 to 79° C.

Those skilled in the art of manufacturing biaxially oriented films know of different and various processes of such manufacture and the present inventive films include biaxially oriented or biaxally stretched films regardless of the method used for their production as well as uniaxially oriented and essentially unoriented films including slot cast and hot blown fir In another inventive embodiment the second polymer of the inventive blend described above is replaced with a copolymer predominantly of ethylene with at least one α-olefin, preferably octene-1, which has a melting point of from 91 to 110° C., and preferably has a $\overline{M}_w/\overline{M}_n<3.5$.

Further examples of preferred embodiments particularly useful e.g. for processing and packaging films in applications where products undergo post-cooking surface pasteurization and/or are cook-in foods, such as cooked turkey breasts, hams, and/or beef are presented below.

EXAMPLES 80–82

In Examples 80–82, inventive biaxially stretched, heat shrinkable, coextruded, multilayer films were made and tested.

Examples 81–82 are essentially four layer films: however due to equipment availability during experimental runs, a 5 layer die was used and the identical layer formulation was used for both the fourth and fifth layers (Example 80 is essentially a three layer film because the first and second layers had identical formulations as well as the fourth and fifth layers). Use of the 5 layer die to make what is formula-wise a four layer film (three layer for Example 80) is equivalent to use of 4 or 3 layer dies respectively. In these examples, one extruder was used for each layer. Each extruder was connected to the same annular coextrusion die from which heat plastified resins were coextruded forming a primary tube having a first inner layer, a second intermediate layer, a third core layer, a fourth intermediate layer, and a fifth outer layer. First and fifth layers were directly attached to opposing sides of the third core layer via second and fourth intermediate layers respectively. The first/second/third/fourth/fifth layer thickness ratio was about 10:50:6.6:23.4:10.

In Examples 80–82, for each layer, the resin mixture was hopper fed into an attached single screw extruder where the mixture was heat plastified and extruded through a 5 layer coextrusion die into a primary tube. The extruder barrel temperatures for the third (core) layer was about 270–295° F. (132–146° C.); and for the remaining layers was about 300–360° F. (149–182° C.). The die temperature profile was set from about 310° F. to 340° F. (154–171 ° C.). The coextruded primary tube was cooled by spraying with cold tap water 45–60F. (about 7–16° C.).

The cooled primary tube was flattened by passage through a pair of nip rollers. In Example 80, a flattened primary tube of about 4 1/16 inches (10.32 cm) flatwidth was produced. For Examples 81 and 82 the primary flatwidth was 4 inches (10.16 cm) and 4 1/32 inches (10.24 cm), respectively. The cooled flattened primary tube was reheated, biaxially stretched, and cooled again.

The cooled, stretched film was flattened and wound on a reel. The M.D. draw ratio was about 4.4:1 to 4.6:1 and the T.D. orientation ratio was about 3.3:1 to 3.4:1 for the films of Examples 80–82. The draw point or orientation temperature was below the predominant melting point for each layer oriented and well above that layer's predominant Tg and is believed to be about 68–85 ° C. for Examples 80–82. The resultant biaxially oriented films of Examples 80–82 all had good shrinkage values at 90° C.

For Examples 80–82, the film structures were as follows. The heat sealing layer was the first layer of the multilayer film and the inner layer of the film tube. The layer compositions are given below. Percentages are based upon weight for the indicated layer.

For Examples 80–82, each core layer(the third layer) comprised a 5.5:1 blend of vinylidene chloride-methylacrylate copolymer (vdc-ma) and vinylidene chloride-vinyl chloride copolymer (vdc-vc). Minor amounts of plasticizing, lubricant and/or colorant additives such as ultramarine blue pigment were also used and are designated as PC additives in the tables. For these and other examples a preferred blend of vinylidene chloride-methylacrylate copolymer (vdc-ma) and vinylidene chloride-vinyl chloride copolymer (vdc-vc) is disclosed in U.S. Pat. No. 4,798,751 which patent is hereby incorporated by reference in its entirety.

For Examples 80–82 layers 2, 4, and 5 comprised identical formulations of: 33% VP 8770; 38.75% LD 701.06; 23% XU 61509.32; 3.25% TM 11384E118; and 2% 11381E118. For Example 80, the first inner layer also comprised the same formula as layers 2, 4, and 5 above.

For Example 81 the first heat sealing layer comprised 100% of a random copolymer of propylene and butene-1 having a melting point of about 144° C. from Shell Oil Company, Atlanta, Ga. under the trademark CEFOR SRD4-131.

For Example 82 the first heat sealing layer comprised 100% of a random copolymer of propylene and butene, having a butene-1 content of about 14% by weight, an m.p. of about 131° C., and an M.I. at 230° C. and 2.16 Kg of about 6.5 dg/min. from Shell Oil Company, Atlanta, Ga. under the trademark CEFOR SRD4-141.

The above film samples were not irradiatively treated. However, they may also be usefully crosslinked by irradiation e.g. at a level of 2–6 megarads (Mrad) after biaxial stretching (which irradiative process is hereinafter referred to as post-irradiation), in the manner generally described in Lustig et al, U.S. Pat. No. 4,737,391 which is hereby incorporated by reference.

Physical properties of Examples 80–82 were tested and reported in Tables 10 and 11.

TABLE 10

| Ex. No. | AVG. GAUGE mil (μ) | TENSILE STRENGTH at RT ×10³ psi (MPa) MD/TD | RAM PUNCTURE | | | HOT WATER PUNCTURE 95° C. seconds (microns) | SHRINK at 90° C. % MD/TD | HAZE % | GLOSS at 45° Angle | O₂GTR†* at RT 0% RH |
|---|---|---|---|---|---|---|---|---|---|---|
| | | | Force Newton | Stress MPa | Total Energy Joule | | | | | |
| 80 | 2.36 (59.9) | 11.7/10.6 (81/73) | 85 | 239 | 0.857 | 34 (75) | 50/52 | 2.6 | 85 | ND |
| 81 | 2.86 (72.6) | 10.1/8.0 (70/55) | 72 | 203 | 0.606 | 120+ (69) | 40/44 | 3.5 | 81 | 29 (84) |
| 82 | 2.56 (65.0) | 10.4/9.2 (72/63) | 68 | 208 | 0.559 | 120+ (67) | 38/48 | 2.8 | 85 | 36 (69) |

RT = Room Temperature (~20–23° C.)
ND = Not Determined
†Oxygen gas transmission rate (O₂GTR) in units of cm³ per meter² per 24 hours at 1 atmosphere for the film tested.
*For O₂GTR the film thickness is below the rate in microns( ).

TABLE 11

| Ex. No. | FLAT WIDTH mm | ELONGATION AT BREAK at RT % MD/TD | 1% SECANT MODULUS at RT MPa MD/TD | SHRINK FORCE AT 90° C. g/mil (g/μ) MD/TD | SHRINK FORCE AT RT g/mil (g/μ) MD/TD |
|---|---|---|---|---|---|
| 80 | 333 | 215/399 | 26.8/25.6 (185/176) | 159/95 (6.3/3.7) | 70/77 (2.8/3.0) |
| 81 | 343 | 338/282 | 41.5/36.3 (286/251) | ND | ND |
| 82 | 356 | 296/271 | 29.0/28.8 (200/199) | ND | ND |

RT = Room Temperature (~20–23° C.)
ND = Not Determined

Referring to Tables 10 and 11. Example 80 has property values acceptable for commercially useful processed meat packaging films, but has low hot water puncture resistance. This short time for puncture resistance in hot water along with known low hot water seal strengths makes this three layer film unsuitable for use in applications where the film and its heat seals are subjected to cooking or pasteurization processes which can be of long duration i.e. minutes in contrast with the 5–20 seconds contact with hot water that often occurs with a shrinking operation. Examples 81–82 of the invention all have excellent hot water puncture values of at least 2 minutes at 95 ° C. whereas the three layer film of Example 80 was measured at 34 seconds. The optical properties (low haze and high gloss) were excellent. Very good values for shrink, tensile, gloss and haze properties for the inventive films are coupled with excellent hot water properties. The elongation at break of the inventive film is also good and the film processed well. The O₂ barrier properties of the exemplified films are controlled by the core layer which utilized a copolymer blend that is known to provide excellent oxygen and moisture barrier properties. Inasmuch as the same thickness core layer was used all the examples 80–82, similarly excellent barrier properties are expected for all films. Examples 80–82 arm all expected to have desirable sealing and puncture resistant properties.

Multilayer films of the invention demonstrate an excellent combination of puncture resistance, optical properties, modulus, shrinkage values and tensile properties. It is further expected that the inventive films will have excellent seal strength properties including tensile seal strength values in excess of 400 g/cm at 88° C., and hot water seal strengths at 95° C. of at least 100 seconds, preferably at least 200 seconds, and most preferably at least 300 seconds over a broad sealing range.

In another preferred embodiment of the invention, the first inner layer may comprise LLDPE, propylene ethylene copolymer or a mixture thereof. Preferred first inner layer polymers include; a linear low density polyethylene which is a copolymer predominantly of ethylene with hexene-1 monomer, having a reported density of about 0.917 g/cm³, an M.I. of 1.0 dg/min., a sharp peak m.p. of 120° C. and a second m.p. of 108.5° C. which is available under the trademark Exceed™ 350D60 from Exxon Chemical Co. of Houston, Tex., and a random copolymer of propylene and ethylene having an m.p.<136° C. a ρ of about 0.895 g/cm³, a Vsp of about 120° C. (ASTM 1525 (1 Kg)) and a M.I. at 230° C. and 2.16 Kg of about 5 dg/min. (available from Solvay & Cie as a bioriented film grade resin, trademark Eltex P KS 409). The present invention contemplates that four and more layer films of structures having a heat sealing surface layer of at least 50% by weight of (i) a copolymer of propene and at least one α-olefin selected from the group consisting of ethylene, butene-1, methylpentene-1, hexene-1, octene-1 and mixtures thereof having a propene content of at least 60 wt. %, or (ii) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm³ coextruded, coating laminated, or otherwise attached to three or more layer structures as defined in Examples 10–16, and 18–25 above and 85–97 below. Especially preferred are four or more layer oxygen barrier films having:

a first heat sealing layer as defined above;
a second and/or fourth intermediate layer comprising a blend of at least three copolymers comprising:
45 to 85 weight percent, more preferably 50 to 85%, of a first polymer having a melting point of from 55 to 95° C. comprising at least one copolymer of ethylene and octene-1;
5 to 35 weight percent of a second polymer having a melting point of from 115 to 128° C. comprising at least one copolymer of ethylene and at least one α-olefin; and
10 to 50 weight percent of a third polymer having a melting point of from 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;

a third core oxygen barrier layer comprising a nylon, EVOH, or vinylidene chloride copolymer; and a fourth layer comprising one or more of the following polymers: an ethylene α-olefin copolymer, nylon, ionomer, an ethylene vinyl ester, an ethylene acrylic acid copolymer, an ethylene alkyl acrylate copolymer, an ethylene methacrylic acid copolymer, an ethylene methacrylate copolymer, an ethylene homopolymer, a propylene homopolymer or copolymer with ethylene, butene-1, methylpentene-1, hexene-1, octene-1 or mixtures thereof.

It is further contemplated that four or more layer oxygen barrier films may be made having a heat sealing layer as defined above with an intermediate or outer layer comprising a blend of at least three copolymers comprising:

25 to 85 weight percent of a first polymer having a melting point of from 55 to 95° C. comprising at least one copolymer of ethylene and octene-1;

5 to 35 weight percent of a second polymer having a melting point of from 115 to 128° C. comprising at least one copolymer of ethylene and at least one α-olefin; and 10 to 50 weight percent of a third polymer having a melting point of from 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers. The invention contemplates that a single interpolymer may comprise both the first and second polymers of the blend defined above, and that interpolymers of either or both of the first and second polymers may be made and used as defined above with respect to polymers F, G, H, and I in Tables 6–9 (see Examples 26–79)above.

EXAMPLES 83–88

In Examples 85–88, inventive biaxially stretched, heat shrinkable, coextruded, multilayer films were made and tested. Examples 83 and 84 are comparative and not of the invention.

Examples 83–88 are essentially three layer films; however due to equipment availability during experimental runs, a 5 layer die was used and the identical layer formulation was used for both the first, second, fourth and fifth layers. Use of the 5 layer die to make what is formula-wise a three layer film is equivalent to use of a 3 layer die. In these examples, one extruder was used for each layer. Each extruder was connected to the same annular coextrusion die from which heat plastified resins were coextruded forming a primary tube having essentially three layers with a inner layer/core layer/outer layer thickness ratio of about 60:6.6:33.4.

In Examples 83–88, for each layer, the resin mixture was hopper fed into an attached single screw extruder where the mixture was heat plastified and extruded through a 5 layer coextrusion die into a primary tube. The extruder barrel temperatures for the core layer was about 270–295° F. (132–146° C.); and for the remaining layers was about 325–340° F.(163–171° C). The die temperature profile was set from about 310° F. to 330° F. (154–166° C.). The coextruded primary tube was cooled by spraying with cold tap water 45–60° F. (about 7–16° C.).

The cooled primary tube was flattened by passage through a pair of nip rollers. In Examples 83, 86, and 87, a flattened primary tube of about 3.94 inches (10.0 cm) flatwidth was produced. For Examples 84, 85, and 88 the primary flatwidth was 3.88 inches (9.86cm), 3.81 inches (9.68 cm) and 4 inches (10.16 cm), respectively. The cooled flattened primary tube was reheated, biaxially stretched, and cooled again.

The cooled, stretched film was flattened and wound on a reel. The M.D. draw ratio was about 3.9:1 to 4.1:1 for Examples 83, and 85–87, and was 3.6:1 for Example 84, and 4.3:1 for Example 88. The T.D. orientation ratio was about 3.6:1 to 3.7:1 for the films of Examples 83, 84, 87, and 88, and was 3.8:1 for Example 85, and 3.5 for Example 86. The draw point or orientation temperature was below the predominant melting point for each layer oriented and above that layer's predominant Tg and is believed to be about 68–85° C. for Examples 83–88. The resultant biaxially oriented films of Examples 83–88 all had good shrinkable values at 90° C.

For Examples 83–88, the film structures were as follows. The heat sealing layer was the first layer of the multilayer film and the inner layer of the film tube. The layer compositions are given below. Percentages are based upon weight for the indicated layer.

For Examples 83–88, each core layer(the third layer) comprised a 5.5:1 blend of vinylidene chloride-methylacrylate copolymer (vdc-ma) and vinylidene chloride-vinyl chloride copolymer (vdc-vc). Minor amounts of plasticizing, lubricant and/or colorant additives such as ultramarine blue were also used. For these and other examples a preferred blend of vinylidene chloride-methylacrylate copolymer (vdc-ma) and vinylidene chloride-vinyl chloride copolymer (vdc-vc) is disclosed in U.S. Pat. No. 4,798,751 which patent is hereby incorporated by reference in its entirety.

For Example 85 of the invention the layers on both sides of the core layer comprised identical formulations of: 58 wt. % of a first polymer comprising a copolymer predominantly of ethylene with octene-1 monomer and having a reported density of about 0.884 g/cm$^3$, a melt index of 1.3 dg/min., a melting point of 67° C. with a minor peak at 107° C. which is available under the trademark DexPlas 2M054 from Dex-Plastomers V.O.F. of Geleen, Netherlands; 19 wt. % 4203; 20 wt. % of a copolymer ethylene and vinyl acetate having a 18% vinyl acetate content, a melting point of about 87° C., a density of 0.94 g/cm$^3$, a melt index of 0.65 dg/min. which is commercially available from DuPont Company of Wilmington, Del., U.S.A. under the trademark Elvax 3165; and 3% 11416E118.

For comparative Example 83, the layers comprised the same blend as for Example 85 above except the EVA was changed to 58% LD 705 and the amount of 2M054 was changed to 19%.

For comparative Example 84, the layers comprised the same blend as for Example 85 above except the amounts changed to 19% 2M054: 58% 4203; 20% 3165: and 3% 11416E118.

Example 86 was similar to Example 85 except the 3165 EVA was replaced LD 705.

Example 87 replaced the layers on both sides of the core layer with a blend of 35% PF 1140; 25% 4203; 37% LD 705; and 3% 11384E118.

Example 88 was similar to Example 87 except the amounts changed to 60% PF 1140; 19% 4203; and 18% LD 705.

The above film samples were not irradiatively treated. However, they may also be usefully crosslinked by irradiation e.g. at a level of 2–6 megarads (Mrad) after biaxial stretching (which irradiative process is hereinafter referred to as post-irradiation), in the manner generally described in Lustig et al, U.S. Pat. No. 4,737,391 which is hereby incorporated by reference.

Physical properties of Examples 83–88 were tested and reported in Table 12.

Examples 89–97 are essentially three layer films; however due to equipment availability during experimental runs, a 5 layer die was used and the identical layer formulation was used for both the first, second, fourth and fifth layers to make what is formula-wise a three layer film. In these examples, one extruder was used for each layer. Each extruder was connected to the same annular coextrusion die from which heat plastified resins were coextruded forming a primary tube having essentially three layers with a inner layer/core layer/outer layer thickness ratio of about 60:6.6:33.4.

TABLE 12

| Ex. No. | AVG. GAUGE mil ($\mu$) | TENSILE STRENGTH at RT ×10³ psi (MPa) MD/TD | RAM PUNCTURE | | | HOT WATER PUNCTURE 95° C. seconds (microns) | SHRINK at 90° C. % MD/TD | SHRINK at 80° C. % MD/TD | GLOSS at 45° Angle | HAZE % |
|---|---|---|---|---|---|---|---|---|---|---|
| | | | Force Newton | Stress MPa | Total Energy Joule | | | | | |
| 83 | 2.15 (54.6) | 8.8/11.0 (61/76) | 62 | 174 | 0.65 | 11 (61) | 52/60 | 34/45 | 84 | 2.9 |
| 84 | 2.73 (69.3) | 10.9/12.1 (75/84) | 82 | 161 | 1.06 | 11 (74) | 50/57 | 37/44 | 53 | 11.5 |
| 85 | 2.54 (64.5) | 11.4/13.3 (78/92) | 71 | 160 | 0.93 | 16 (66) | 59/64 | 53/61 | 86 | 2.6 |
| 86 | 2.70 (68.6) | 10.2/10.8 (71/74) | 67 | 141 | 0.90 | 9 (64) | 56/62 | 52/54 | 67 | 5.9 |
| 87 | 2.48 (63.0) | ND | 82 | 209 | 0.96 | ND | 49/56 | 31/41 | 85 | 3.0 |
| 88 | 2.35 (59.7) | ND | 86 | 206 | 1.07 | ND | 49/55 | 30/40 | 86 | 2.7 |

RT = Room Ternperature (~20–23° C.)
ND = Not Determined

Referring to Table 12, Comparative Example 83 having a low amount (19%) of the first polymer and high amount (58%) of the EVA suffers from low puncture resistance as demonstrated by a low total energy absorbed at maximum puncture value and a low puncture force. The inventive films all have very good puncture resistance and good tensile strengths. All of the films of Examples had excellent shrinkage values at both 90° C. and 80° C. The low temperature (80° C.) values in excess of 50 in either or both M.D. and T.D. directions for Examples 85 and 86 are remarkably high. The optical properties in general are also very good with the inventive films of Examples 85, 87, and 88 having excellent high gloss and low haze values. Comparative example 84 suffers from extremely low gloss and high haze being from about 2 to 4 times as hazy as the inventive films. All of these films of Examples 83–88 were made without powdering which may affect optical properties. The combination of high shrinkage values, particularly at low temperatures, and excellent optics with high resistance to puncture produces films suitable for packaging applications and having unique combinations of highly desirable physical properties. It is especially noteworthy that an EVA having a high VA content (e.g. 18 wt. %) could be blended with ethylene $\alpha$-olefin copolymers to produce films having both remarkably high shrinkage values at both 90 and 80° C. and have excellent high gloss and low haze as seen in Example 85 with all shrinkage values in excess of 45% and gloss in excess of 80% and haze less than 5%. It is amazing that films having excellent optical properties with 80° C. shrinkage values in excess of 50% in a single direction were produced and in Example 85 the inventive film had in excess of 50% shrink in both M.D. and T.D. directions.

EXAMPLES 89–97

In Examples 89–97, inventive biaxially stretched, heat shrinkable, coextruded, multilayer films were made and tested.

In Examples 89–97 the films were made by a process and under conditions similar to that employed for Examples 83–88 except as follows. The extruder barrel temperatures for the core layer were about 250–275° F. (121–135° C.); and for the remaining layers was about 340–370F. (171–188C.). The die temperature profile was set from about 310° F. to 340° F. (154–171° C.). In Examples 89–91, a flattened primary tube of about 8.1 cm flatwidth was produced (about 7.1 cm for Examples 92–97). The M.D. draw ratio was about 4.9:1 to 5:1 for Examples 89–97. The T.D. orientation ratio was about 4.1:1 for the films of Examples 89–91. and was about 4.7:1 for Examples 92–97.

For Examples 89–97, the film structures were as follows. The heat sealing layer was the first layer of the multilayer film and the inner layer of the film tube. The layer compositions are given below. Percentages are based upon weight for the indicated layer.

For Examples 89–97, each core layer(the third layer) was similar to that used in Examples 83–88 above.

For Example 89 the layers on both sides of the core layer comprised identical formulations of: 35 wt. % of a first polymer comprising a copolymer predominantly of ethylene with octene-1 monomer and having a reported density of about 0.896 g/cm³, a melt index of 1.2 dg/min., a melting point of 90° C. which is available under the trademark DexPlas 2M070 from Dex-Plastomers V.O.F. of Geleen, Netherlands; 23 wt. % 4203; 35 wt. % of LD 705; 5 wt. % a processing aid which combined fluoroelastomer and erucamide in an ethylene $\alpha$-olefin copolymer carrier resin sold under the trademark Techmer PM 11506E12, and 2% of a stabilizer additive in an ethylene $\alpha$-olefin copolymer carrier resin sold under the trademark Ampacet 501234 by Ampacet Corp. of Tarrytown, N.Y., U.S.A.

For Example 90, the layers comprised the same blend as for Example 91 above except the amounts changed to 45% 2M070; 21% 4203: 27% LD 705.

Example 91 was similar to Example 89 except the LD 705 EVA was replaced with 18% 3165, and amounts of 2M070 and 4203 were changed to 58% and 17%, respectively.

Examples 92 and 93 were similar to Example 91 except in both examples the 3165 EVA, 11506E12, and 501234 were replaced with LD 705, 11416E118, and 11381E118, respectively.

Examples 94 and 95 were similar to Example 93 except 4203 and LD 705 were changed to XU 61509.32 and LD 701 in both examples.

Examples 96 and 97 was similar to Example 95 except the amounts changed lo 34% 2M070; 23% XU 61509.32; and 36% LD 701.

Examples 89–92, 94, and 96 were not irradiatively treated. Examples 93, 95. and 97 were crosslinked by irradiation at a level of 4.0 megarads (Mrad) after biaxial stretching in the manner generally described in Lustig et al, U.S. Pat. No. 4,737,391 which is hereby incorporated by reference.

Physical properties of Examples 89–97 were tested and reported in Table 13.

TABLE 13

| Ex. No. | AVG. GAUGE ($\mu$) | TENSILE STRENGTH at RT (MPa) MD/TD | RAM PUNCTURE | | | SHRINK at 90° C. % MD/TD | SHRINK at 80° C. % MD/TD | HAZE % | GLOSS at 45° Angle | IRRADIATION (Mrad) |
|---|---|---|---|---|---|---|---|---|---|---|
| | | | Force Newton | Stress MPa | Total Energy Joule | | | | | |
| 89 | 54 | 81/95 | 94 | 272 | 0.95 | 52/56 | 32/41 | 6.5 | 73 | 0 |
| 90 | 54 | 92/97 | 107 | 287 | 1.22 | 53/57 | 33/43 | 5.3 | 75 | 0 |
| 91 | 53 | 89/108 | 105 | 276 | 1.23 | 55/58 | 37/45 | 7.7 | 64 | 0 |
| 92 | 59 | 101/108 | 118 | 292 | 1.29 | 52/57 | 32/42 | 4.9 | 83 | 0 |
| 93 | 60 | 93/90 | 94 | 245 | 0.89 | 51/53 | 30/37 | 7.2 | 78 | 4 |
| 94 | 59 | 98/100 | 117 | 297 | 1.22 | 49/56 | 29/40 | 4.5 | 85 | 0 |
| 95 | 57 | 101/80 | 91 | 258 | 0.82 | 46/51 | 26/33 | 7.2 | 77 | 4 |
| 96 | 54 | 84/95 | 99 | 297 | 1.23 | 43/51 | 25/36 | 4.9 | 79 | 0 |
| 97 | 53 | 94/99 | 86 | 295 | 0.73 | 43/48 | 22/32 | 7.3 | 76 | 4 |

RT = Room Temperature (~20–23° C.)

Referring now to Table 13, in this set of Examples a first polymer having a higher density and melting point relative to the first polymer used in Examples 83–88 was used with various second polymers of ethylene α-olefins and EVAs. The biaxially oriented films of Examples 89–97 all had excellent shrinkage values at both 90° C. and at 80° C., but less than those reported for Examples 83–88. Generally these films had excellent puncture resistance and tensile properties. The effect of crosslinking by irradiation is seen to reduce optical, shrinkage, and puncture resistance properties, however irradiation typically is performed for many applications where a broad heat sealing range is required because crosslinking broadens the sealing range and raises the temperature resistance of the crosslinked film. The films of these examples all have commercially acceptable and desirable properties.

While this invention has been described with reference to certain specific embodiments, it will be recognized by those skilled in the art that many variations are possible without departing from the scope and spirit of the invention.

What is claimed is:

1. A flexible, thermoplastic, biaxially stretched, heat shrinkable film having at least one layer comprising a blend of at least three copolymers comprising:

25 to 85 weight percent of a first polymer having a melting point of from 55 to 95° C. comprising at least one copolymer of ethylene and octene-1;

5 to 35 weight percent of a second polymer having a melting point of from 115 to 128° C. comprising at least one copolymer of ethylene and at least one α-olefin; and 10 to 50 weight percent of a third polymer having a melting point of from 60 to 110° C. comprising at least one unmodified or anhydride-modified copolymer of ethylene and a vinyl ester, acrylic acid, methacrylic acid or an alkyl acrylate; wherein said first and second polymers have a combined weight percentage of at least 50 weight percent, said weight percentage being based upon the total weight of said first, second and third polymers; and wherein said film has a shrinkage value at 90° C. of at least 45% in at least one of the machine direction or transverse direction, and said film has a ram puncture force of at least 65 Newtons.

2. A polymer film, as defined in claim 1, wherein said first polymer has a melting point of from 80 to 85° C.

3. A polymer film, as defined in claim 1, wherein said first polymer is a bipolymer.

4. A polymer film, as defined in claim 1, wherein said first polymer is a terpolymer comprising: ethylene, hexene-1 and octene-1; or ethylene, butene-1 and octene.

5. A polymer film, as defined in claim 1, wherein said second polymer comprises a copolymer of ethylene and octene-1.

6. A polymer film, as defined in claim 1, wherein said third polymer is selected from the group consisting of ethylene vinyl acetate copolymer, ethylene methylacrylate copolymer, ethylene butylacrylate copolymer, and ethylene ethylacrylate copolymer.

7. A film, as defined in claim 1, wherein said third polymer comprises a copolymer of ethylene and vinyl acetate.

8. A film, as defined in claim 1, further comprising a fourth polymer having a melting point of from 91 to 110° C.

9. A film, as defined in claim 1, having a haze value of less than 10%.

10. A film, as defined in claim 1, wherein said film has a shrinkage value at 80° C. of at least 30% in at least one of the machine and transverse directions.

11. A film, as defined in claim 1, wherein said film has a shrinkage value at 80° C. of at least 35% in at least one of the machine and transverse directions.

12. A film, as defined in claim 1, wherein said film has a shrinkage value at 80° C. of at least 35% in both the machine and transverse directions.

13. A film, as defined in claim 1, wherein said film has a shrinkage value at 80° C. of at least 45% in at least one of the machine and transverse directions.

14. A film, as defined in claim 1, wherein said film has a shrinkage value at 90° C. of at least 45% in both the machine and transverse directions.

15. A film, as defined in claim 1, wherein said film has a total energy at maximum puncture force of at least 0.60 Joule.

16. A film, as defined in claim 1, wherein said film has a total energy at maximum puncture force of at least 0.80 Joule.

17. A film, as defined in claim 1, wherein said film has a total energy at maximum puncture force of at least 1.0 Joule.

18. A film, as defined in claim 1, wherein said film has a maximum ram puncture force of at least 100 Newtons.

19. A film, as defined in claim 1, wherein said film has a maximum ram puncture force of at least 110 Newtons.

20. A film, as defined in claim 1, wherein said film has a ram puncture stress of at least 140 MPa.

21. A film, as defined in claim 1, wherein said first polymer has a $\overline{M_w}/\overline{M_n}$ of from 1.5 to 3.0.

22. A film, as defined in claim 1, wherein said first polymer has a $\overline{M_w}/\overline{M_n}$ of from 2.2 to 2.7.

23. A film, as defined in claim 1, wherein said first polymer has a melt index of from 1.5 to 3.0 dg/min.

24. A film, as defined in claim 1, wherein said first polymer has a melt index of from 0.3 to 1.5 dg/min.

25. A film, as defined in claim 1, wherein said first polymer has a melt index less than 2.5 dg/min.

26. A film, as defined in claim 1, further comprising at least one additional other thermoplastic layer.

27. A film, as defined in claim 1, further comprising at least three additional thermoplastic layers.

28. A film, as defined in claim 1, wherein said layer comprising a blend has been irradiatively crosslinked.

29. A film, as defined in claim 1, wherein said film forms a tube having an inner heat sealing layer comprising said blend.

30. A film, as defined in claim 1, wherein said film is fabricated into bags.

31. A film, as defined in claim 26, wherein said additional layer comprises a gas barrier layer and said film has an oxygen transmission rate of less than 15 cc/100 in$^2$ for 24 hrs. at 1 atm at 23° C.

32. A film, as defined in claim 26, wherein said film is a tubular multilayer film formed by coextrusion or coating lamination and said tubular film has an inner heat sealing layer comprising said blend.

33. A film, as defined in claim 1, wherein said blend comprises at least 50 percent by weight of said layer based on the total weight of the layer.

34. A film, as defined in claim 1, wherein said first polymer is present in an amount of from 25 to 45 weight percent, based upon the total weight of the first, second and third polymers.

35. A film, as defined in claim 1, wherein said first polymer is present in an amount of from 30 to 40 weight percent, based upon the total weight of the first, second and third polymers.

36. A film, as defined in claim 1, wherein said first polymer is present in an amount of from 45 to 85 weight percent, based upon the total weight of the first, second and third polymers.

37. A film, as defined in claim 1, wherein said first polymer is present in an amount of from 50 to 85 weight percent, based upon the total weight of the first, second and third polymers.

38. A film, as defined in claim 1, wherein at least one of said first, second, and third polymers comprises an interpolymer.

39. A film, as defined in claim 1, wherein at least one interpolymer comprises said first and second polymers.

40. A film, as defined in claim 27, wherein said film comprises:
a first heat sealing surface layer comprising a polymer selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm$^3$;
a second intermediate layer;
a third core layer comprising at least 80% by weight, based on said third layer's weight, of at least one copolymer of vinylidene chloride with from 2 to 20 weight percent, based on said copolymer's weight, of vinyl chloride or methyl acrylate; and
a fourth surface layer;
wherein at least one of said second and said fourth layers comprise a blend of at least three copolymers comprising:
25 to 85 weight percent of a first polymer having a melting point of 55 to 95° C. comprising at least one copolymer of ethylene and octene-1;
5 to 35 weight percent of a second polymer having a melting point of 115 to 128° C. comprising at least one copolymer of ethylene and at least one α-olefin; and
10 to 50 weight percent of a third polymer having a melting point of 60 to 110° C. comprising at least one unmodified or anhydride-modified copolymer of ethylene and a vinyl ester, acrylic acid, methacrylic acid or an alkyl acrylate; wherein said first and second polymers have a combined weight percentage of at least 50 weight percent, said weight percentage being based upon the total weight of said first, second and third polymers; and wherein said film has a shrinkage value at 90° C. of at least 45% in at least one of the machine direction or transverse direction, and said film has a maximum ram puncture force of at least 65 Newtons; and said core layer is disposed between said second and said fourth layers.

41. A film, as defined in claim 40, wherein said film has a shrinkage value at 80° C. of at least 30% in at least one of the machine and transverse directions.

42. A film, as defined in claim 40 or 41, wherein said film has a tensile seal strength of at least 400 g/cm at 88° C.

43. A film, as defined in claim 40, wherein said film has a tensile seal strength of at least 600 g/cm at 88° C.

44. A film, as defined in claim 40 or 41, wherein said film has a hot water puncture resistance value of at least 40 seconds at 95° C.

45. A film, as defined in claim 40, wherein said film has a hot water puncture resistance value of at least 100 seconds at 95° C.

46. A film, as defined in claim 40 or 41, wherein said film has an average hot water seal strength of at least 200 seconds at 95° C.

47. A film, as defined in claim 40 or 41, wherein said film has an average hot water seal strength of at least 300 seconds at 95° C.

48. A film, as defined in claim 1 or 40, wherein said film has a ram puncture stress of at least 200 MPa.

49. A film, as defined in claim 40, wherein said melting point of said first heat sealing surface layer polymer (b) is at least 115° C.

50. A biaxially stretched, heat shrinkable film comprising a blend of: (i) an interpolymer comprising at least a copolymer of ethylene and octene-1 and having a first melting point of from 55 to 95° C. and a second melting point of from 115 to 128° C., and (ii) a polymer having a melting point of from 60 to 110° C. comprising an unmodified or anhydride-modified copolymer of ethylene and a vinyl ester, acrylic acid, methacrylic acid, or alkyl acrylate; said film having a shrinkage value at 90° C. of at least 45% in at least one of the machine and transverse directions.

51. A flexible, thermoplastic, biaxially stretched, heat shrinkable film having at least one layer comprising a blend of at least three copolymers comprising:

45 to 85 weight percent of a first polymer having a melting point of from 55 to 95 ° C. comprising at least one copolymer of ethylene and octene-1;

5 to 35 weight percent of a second polymer having a melting point of from 115 to 128° C. comprising at least one copolymer of ethylene and at least one α-olefin; and 10 to 50 weight percent of a third polymer having a melting point of from 60 to 110° C. comprising at least one unmodified or anhydride-modified copolymer of ethylene and a vinyl ester, acrylic acid, methacrylic acid, or an alkyl acrylate; wherein said first and second polymers have a combined weight percentage of at least 50 weight percent, said weight percentage being based upon the total weight of said first, second and third polymers; and wherein said film has a total energy absorption of at least 0.70 Joule and a shrinkage value at 90° C. of at least 50% in at least one of the machine and transverse directions.

52. A film, as defined in claim 51, wherein said first polymer comprises 50 to 85 weight % of said blend.

53. A film, as defined in claim 51, wherein said film has a maximum puncture force of at least 90 Newtons.

54. A film, as defined in claim 51, wherein said film has a shrinkage value at 80° C. of at least 35% in at least one of the machine and transverse directions.

55. A film, as defined in claim 51, wherein said film has a shrinkage value at 80° C. of at least 35% in both the machine and transverse directions.

56. A film, as defined in claim 51, wherein said film has a shrinkage value at 80° C. of at least 50% in at least one of the machine and transverse directions.

57. A film, as defined in claim 51, wherein said film has a shrinkage value at 80° C. of at least 50% in both the machine and the transverse directions.

58. A film, as defined in claim 51, wherein said film has a total energy absorption of at least 0.90 Joules.

59. A film, as defined in claim 51, wherein said film has a maximum stress of at least 200 MPa.

60. A film, as defined in claim 51 or 52, wherein at least one of said first, second, and third polymers comprises an interpolymer.

61. A film, as defined in claim 51, further comprising at least one additional thermoplastic layer.

62. A film, as defined in claim 51, further comprising at least four additional thermoplastic layers.

63. A film, as defined in claim 51 or 52, wherein said film comprises:

a first heat sealing surface layer comprising a polymer selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm$^3$;

a second intermediate layer;

a third core layer comprising at least 80% by weight, based on said third layer's weight, of at least one copolymer of vinylidene chloride with from 2 to 20 weight percent, based on said copolymer's weight, of vinyl chloride or methyl acrylate; and a fourth surface layer;

wherein at least one of said second and said fourth layers comprise said blend of at least three copolymers, and said core layer is disposed between said second and said fourth layers.

64. A film, as defined in claim 63, wherein said film has a tensile seal strength of at least 400 g/cm at 88° C.

65. A film, as defined in claim 63, wherein said film has a hot water puncture resistance value of at least 40 seconds at 95° C.

66. A film, as defined in claim 63, wherein said film has a hot water puncture resistance value of at least 100 seconds at 95° C.

67. A film, as defined in claim 63, wherein said film has an average hot water seal strength of at least 200 seconds at 95° C.

68. A film, as defined in claim 63, wherein said film has an average hot water seal strength of at least 300 seconds at 95° C.

69. A film, as defined in claim 63, wherein said melting point of said first heat sealing surface layer polymer (b) is at least 115° C.

70. A biaxially stretched, heat shrinkable film comprising at least three layers, wherein said first layer comprises a blend of at least three polymers comprising: a first polymer having a melting point of from 55 to 95° C. comprising a copolymer of ethylene and octene-1; a second polymer having a melting point of from 115 to 128° C. comprising a copolymer of ethylene and at least one α-olefin; a third polymer having a melting point of from 60 to 110° C. comprising a copolymer ethylene and a vinyl ester or alkyl acrylate; a third layer comprising at least 50 percent by weight of copolymer of ethylene with at least one alpha-olefin or at least one vinyl ester or blends thereof, and a second layer between said first and third layers; said second layer comprising a vinylidene chloride copolymer, a nylon or a copolymer of ethylene with a vinyl alcohol; said film having a maximum ram puncture force of at least 65 Newtons, a total energy absorption of at least 0.50 Joule, and a shrinkage value at 90° C. of at least 45% in at least one of the machine and transverse directions.

71. A film, as defined in claim 70, wherein said film has a shrinkage value at 90° C. of at least 45% in both of the machine and transverse directions.

72. A film, as defined in claim 70, wherein said film has a shrinkage value at 80° C. of at least 35% in at least one of the machine and transverse directions.

73. A film, as defined in claim 70, wherein said film has a maximum puncture force of at least 90 Newtons.

74. A film, as defined in claim 70, wherein said film has a total energy absorption of at least 0.9 Joule.

75. A film, as defined in claim 70, wherein at least one of said first, second, and third polymers comprises an interpolymer.

76. A film, as defined in claim 70, wherein at least one interpolymer comprises both said first and second polymers.

77. A polymer blend of at least three copolymers consisting essentially of:
- 25 to 85 weight percent of a first polymer having a melting point of from 55 to 95° C. comprising at least one copolymer of ethylene and octene-1;
- 5 to 35 weight percent of a second polymer having a melting point of from 115 to 128° C. comprising at least one copolymer of ethylene and at least one α-olefin;
- 10 to 50 weight percent of a third polymer having a melting point of from 60 to 110° C. comprising at lease one copolymer of ethylene and a vinyl ester or an alkyl acrylate; wherein said first and second polymers have a combined weight percentage of at least 50 weight percent, said weight percentage being based upon the total weight of said first, second and third polymers; and
- wherein at least one of said first, second, and third polymers comprises an interpolymer.

78. A blend, as defined in claim 77, wherein an interpolymer comprises both said first and second polymers.

79. A flexible film, wherein said film comprises:
- a heat sealing surface layer comprising a polymer selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm$^3$;
- an intermediate layer;
- a core layer;
- an outer protective surface layer;
- wherein at least one of said intermediate and said outer protective layers comprise a polymer blend of at least three copolymers consisting essentially of:
  - 25 to 85 weight percent of a first polymer having a melting point of from 55 to 95° C. comprising at least one copolymer of ethylene and octene-1;
  - 5 to 35 weight percent of a second polymer having a melting point of from 115 to 128° C. comprising at least one copolymer of ethylene and at least one α-olefin; and
  - 10 to 50 weight percent of a third polymer having a melting point of from 60 to 110° C. comprising at least one unmodified or anhydride-modified copolymer of ethylene and a vinyl ester or an alkyl acrylate; wherein said first and second polymers have a combined weight percentage of at least 50 weight percent, said weight percentage being based upon the total weight of said first, second and third polymers;
- and said core layer is disposed between said intermediate and said outer protective layers.

80. A process for making biaxially stretched, heat shrinkable film comprising:
- extruding a melt plastified primary tube comprising at least one layer consisting essentially of 25 to 85 weight percent of a first polymer having a melting point of from 55 to 95° C. comprising at least one copolymer of ethylene and octene-1;
- 5 to 35 weight percent of a second polymer having a melting point of from 115 to 128° C. comprising at least one copolymer of ethylene and at least one α-olefin; and
- 10 to 50 weight percent of a third polymer having a melting point of from 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;
- cooling said primary tube;
- reheating said cooled tube to a draw point temperature of from 65 to 88° C.;
- biaxially stretching said tube to a circumference of at least 2½ times the circumference of said primary tube, and cooling said biaxially stretched tube to form a biaxially stretched, heat shrinkable film; and
- wherein said resultant film has a maximum ram puncture force of at least 65 Newtons, a total energy absorption of at least 0.50 Joule, and a shrinkage value at 90° C. of at least 45% in at least one of the machine and transverse directions.

81. A process for making biaxially stretched, heat shrinkable film comprising:
- extruding a melt plastified primary tube comprising at least one layer consisting essentially of 25 to 85 weight percent of a first polymer having a melting point of from 55 to 95° C. comprising at least one copolymer of ethylene and octene-1;
- 5 to 35 weight percent of a second polymer having a melting point of from 115 to 128° C. comprising at least one copolymer of ethylene and at least one α-olefin; and
- 10 to 50 weight percent of a third polymer having a melting point of from 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;
- cooling said primary tube;
- reheating said cooled tube to a draw point temperature of from 65 to 88° C.;
- biaxially stretching said tube to a circumference of at least 2½ times the circumference of said primary tube, and cooling said biaxially stretched tube to form a biaxially stretched, heat shrinkable film; and
- wherein said resultant film has a maximum ram puncture force of at least 90 Newtons, a total energy absorption of at least 0.90 Joule, and a shrinkage value at 90° C. of at least 50% in both of the machine and transverse directions.

82. A process for making biaxially stretched, heat shrinkable film comprising:
- extruding a melt plastified primary tube comprising at least one layer consisting essentially of 25 to 85 weight percent of a first polymer having a melting point of from 55 to 95° C. comprising at least one copolymer of ethylene and octene-1;
- 5 to 35 weight percent of a second polymer having a melting point of from 115 to 128° C. comprising at least one copolymer of ethylene and at least one α-olefin; and
- 10 to 50 weight percent of a third polymer having a melting point of from 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;

cooling said primary tube;

reheating said cooled tube to a draw point temperature of from 65 to 88° C.;

biaxially stretching said tube to a circumference of at least 2½ times the circumference of said primary tube, and cooling said biaxially stretched tube to form a biaxially stretched, heat shrinkable film;

wherein a multilayer primary tube is made by coextrusion or coating lamination and said resultant biaxially stretched film comprises:

a heat sealing surface layer comprising a polymer selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm$^3$;

an intermediate layer;

a core layer comprising at least 80% by weight, based on said third layer's weight, of at least one copolymer of: EVOH; or vinylidene chloride with from 2 to 20 weight percent, based on said copolymer's weight, of vinyl chloride or methyl acrylate; and an outer protective surface layer;

wherein at least one of said intermediate and said outer protective layers comprise, a polymer blend of at least three copolymers comprising:

25 to 85 weight percent of a first polymer having a melting point of from 55 to 95° C. comprising at least one copolymer of ethylene and octene-1;

5 to 35 weight percent of a second polymer having a melting point of from 115 to 128° C. comprising at least one copolymer of ethylene and at least one α-olefin; and 10 to 50 weight percent of a third polymer having a melting point of from 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers, and said core layer is disposed between said intermediate and said outer protective layers, and said film has a maximum ram puncture force of at least 100 Newtons, a hot water puncture resistance of at least 100 seconds at 95° C. and a hot water seal strength of at least 200 seconds at 95° C.

83. A biaxially stretched, heat shrinkable, multilayer film useful for food processing and packaging having at least four layers comprising:

a first heat sealing surface layer comprising a polymer or blend of polymers selected from the group consisting of: (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and (b) at least 50% by weight of a copolymer of ethylene and at least one α-olefin selected from the group consisting of propylene, butene-1, methylpentene-1, hexene-1, octene-1 and mixtures thereof having a melting point of at least 105° C. and a density of at least 0.900 g/cm$^3$;

a second polymeric layer comprising a blend of (a) from 25 to 85 wt. % of a first polymer having a melting point of 55 to 95° C. comprising a copolymer of ethylene and octene-1; (b) from 5 to 35 wt. % of a second polymer having a melting point of 115° C. to 128° C. comprising a copolymer of ethylene and at least one $C_4$–$C_8$ α-olefin; and (c) from 10 to 50 wt. % of a third polymer having a melting point of 60 to 110° C. comprising a copolymer of ethylene with a vinyl ester, acrylic acid, methacrylic acid, or alkyl acrylate, wherein said first and second copolymers have a combined weight percentage of at least 50 weight percent, said weight percent being based upon the total weight of said first, second and third polymers;

a third layer comprising at least 80% by weight, based on said third layer's weight, of EVOH or at least one copolymer of vinylidene chloride with from 2 to 20 weight percent, based on said copolymer's weight, of vinyl chloride or methyl acrylate; and a fourth polymeric layer comprising (a) from 10 to 85 wt. % of a first copolymer of ethylene and at least one $C_3$–$C_8$ α-olefin, said first copolymer having a melting point of 55 to 98° C., (b) from 5 to 60 wt. % of a second copolymer of ethylene and at least one $C_4$–$C_8$ α-olefin, said second copolymer having a melting point of 115° C. to 128° C., and (c) from 0 to 50 wt. % of a third copolymer having a melting point of 60 to 110° C. of ethylene with a vinyl ester, acrylic acid, methacrylic acid, or alkyl acrylate, wherein said first and second copolymers have a combined weight percentage of at least 50 weight percent, said weight percent being based upon the total weight of said layer; and wherein said film has a shrinkage value at 90° C. of at least 40% in at least one of the machine and transverse directions, and said film has a tensile seal strength of at least 400 g/cm at 88° C.

84. A film, as defined in claim 83, wherein said film has a maximum ram puncture force of at least 70 Newtons.

85. A film, as defined in claim 83, wherein said film has a maximum ram puncture force of at least 110 Newtons.

86. A film, as defined in claim 83, wherein said film has a hot water puncture resistance of at least 25 seconds at 95° C.

87. A film, as defined in claim 83, wherein said film has a hot water puncture resistance of at least 40 seconds at 95° C.

88. A film, as defined in claim 83, wherein said film has a hot water puncture resistance of at least 100 seconds at 95° C.

89. A film, as defined in claim 83, wherein said film has a hot water seal strength of at least 200 seconds at 95° C.

90. A film, as defined in claim 83, wherein said film has a hot water seal strength of at least 300 seconds at 95° C.

91. A film, as defined in claim 83, wherein said melting point of said first heat sealing surface layer polymer (b) is at least 115° C.

92. A film, as defined in claim 83, wherein said film has a thickness less than 175 microns.

93. A film, as defined in claim 83, wherein said film has a haze value of less than 10% and a gloss at 45° of at least 70 Hunter units.

94. A film, as defined in claim 83, wherein said film has an oxygen transmission rate of less than 45 cm$^3$/m$^2$ for 24 hrs. at 1 atm at 23° C.

95. A film, as defined in claim 83, wherein said first copolymer of at least one of said second and fourth layers has a density less than 0.900 g/cm$^3$.

96. A film, as defined in claim 83, wherein said first copolymer of both said second and fourth layers has a density less than 0.900 g/cm³.

97. A film, as defined in claim 83, wherein said third copolymer of both said second and fourth layers comprises 4 to 18%, by weight of said copolymer, of a vinyl ester or 4 to 30 wt. % of an alkyl acrylate.

98. A film, as defined in claim 83, wherein in said fourth polymeric layer comprises a blend of: (a) from 25 to 85 wt. % of a first polymer having a melting point of 55 to 95° C. comprising a copolymer of ethylene and octene-1; (b) from 5 to 35 wt. % of a second polymer having a melting point of 115° C. to 128° C. comprising a copolymer of ethylene and at least one $C_4$–$C_8$ α-olefin; and (c) from 10 to 50 wt. % of a third polymer having a melting point of 60 to 110° C. comprising a copolymer of ethylene with a vinyl ester, acrylic acid, methacrylic acid, or alkyl acrylate, wherein said first and second copolymers have a combined weight percentage of at least 50 weight percent, said weight percent being based upon the total weight of said first, second and third polymers.

99. A film, as defined in claim 83, wherein said melting point of said first heat sealing surface layer polymer (b) is at least 115° C.

100. A film, as defined in claim 83, wherein said copolymer of ethylene and octene-1 is present in an amount of 50 to 85 wt. %.

101. A film, as defined in claim 83, wherein said copolymer of ethylene and octene-1 is present in an amount of 25 to 50 wt. %.

102. A polymer blend of at least three copolymers comprising:
   25 to 85 weight percent of a first polymer having a melting point of from 55 to 95° C. comprising at least one copolymer of ethylene and octene-1;
   5 to 35 weight percent of a second polymer having a melting point of from 115 to 128° C. comprising at least one copolymer of ethylene and at least one α-olefin; and
   10 to 50 weight percent of a third polymer having a melting point of from 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers, wherein at least one of said first, second and third polymers comprises an interpolymer.

103. A blend, as defined in claim 102, wherein an interpolymer comprises said first and second polymers.

104. A flexible film comprising at least one layer comprising the blend of claim 102.

105. A process for making biaxially stretched, heat shrinkable film comprising:
   extruding a melt plastified primary tube comprising 25 to 85 weight percent of a first polymer having a melting point of from 55 to 95° C. comprising at least one copolymer of ethylene and octene-1;
   5 to 35 weight percent of a second polymer having a melting point of from 115 to 128° C. comprising at least one copolymer of ethylene and at least one α-olefin; and
   10 to 50 weight percent of a third polymer having a melting point of from 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers;
   cooling said primary tube;
   reheating said cooled tube to a draw point temperature of from 65 to 88° C.;
   biaxially stretching said tube to a circumference of at least 2½ times the circumference of said primary tube, and cooling said biaxially stretched tube to form a biaxially stretched, heat shrinkable film;
   wherein said resultant film has a maximum ram puncture force of at least 65 Newtons, a total energy absorption of at least 0.50 Joule, and a shrinkage value at 90° C. of at least 45% in at least one of the machine and transverse directions.

106. A process, as defined in claim 105, wherein said resultant film has a maximum ram puncture force of at least 90 Newtons, a total energy absorption of at least 0.90 Joule, and a shrinkage value at 90° C. of at least 50% in both of the machine and transverse directions.

107. A process, as defined in claim 105, wherein a multilayer primary tube is made by coextrusion or coating lamination and said resultant biaxially stretched film comprises:
   a heat sealing surface layer comprising a polymer selected from the group consisting of:
   (a) at least 50% by weight of a copolymer of propene and at least one α-olefin selected from the group consisting of ethylene, butene-1, methylpentene-1, hexene-1, octene-1 and mixtures thereof having a propene content of at least 60 wt. %, and
   (b) at least 50% by weight of a copolymer of ethylene and at least one α-olefin selected from the group consisting of propylene, butene-1, methylpentene-1, hexene-1, octene-1, and mixtures thereof having a melting point of at least 105° C. and a density of at least 0.900 g/cm³;
   an intermediate layer;
   a core layer comprising at least 80% by weight (based on said third layer's weight) of at least one copolymer of: EVOH; or vinylidene chloride with from 2 to 20 weight percent (based on said copolymer's weight) of vinyl chloride or methyl acrylate; and
   an outer protective surface layer;
   wherein at least one of said intermediate and said outer protective layers comprise a polymer blend of at least three copolymers comprising:
   25 to 85 weight percent of a first polymer having a melting point of from 55 to 95° C. comprising at least one copolymer of ethylene and octene-1;
   5 to 35 weight percent of a second polymer having a melting point of from 115 to 128° C. comprising at least one copolymer of ethylene and at least one α-olefin; and
   10 to 50 weight percent of a third polymer having a melting point of from 60 to 110° C. comprising at least one copolymer of ethylene and a vinyl ester or an alkyl acrylate; wherein said first and second polymers have a combined weight percentage of at least 50 weight percent, said weight percentage being based upon the total weight of said first, second and third polymers, and said core layer is disposed between said intermediate and said outer protective layers, and said film has a maximum ram puncture force of at least 100 Newtons, and a hot water seal strength of at least 200 seconds at 95° C.

* * * * *